(12) United States Patent
Okada et al.

(10) Patent No.: US 7,810,409 B2
(45) Date of Patent: Oct. 12, 2010

(54) STEERING COLUMN APPARATUS

(75) Inventors: Shinji Okada, Fujisawa (JP); Hiroshi Shibazaki, Fujisawa (JP)

(73) Assignee: NSK Ltd., Tokyo (JP)

( * ) Notice: Subject to any disclaimer, the term of this patent is extended or adjusted under 35 U.S.C. 154(b) by 29 days.

(21) Appl. No.: 11/913,760

(22) PCT Filed: May 1, 2006

(86) PCT No.: PCT/JP2006/309119

§ 371 (c)(1),
(2), (4) Date: Nov. 6, 2007

(87) PCT Pub. No.: WO2006/120968

PCT Pub. Date: Nov. 16, 2006

(65) Prior Publication Data

US 2009/0044656 A1   Feb. 19, 2009

(30) Foreign Application Priority Data

May 6, 2005   (JP)   ............................. 2005-134974
May 17, 2005  (JP)   ............................. 2005-143434
Mar. 16, 2006 (JP)   ............................. 2006-072616

(51) Int. Cl.
*B62D 1/18* (2006.01)
(52) U.S. Cl. ........................................ 74/493; 280/775
(58) Field of Classification Search .................. 74/493; 280/775, 777
See application file for complete search history.

(56) References Cited

U.S. PATENT DOCUMENTS

| 4,594,909 A | * | 6/1986 | Yamaguchi | 74/493 |
| 4,941,766 A | * | 7/1990 | Carlson | 403/131 |
| 5,078,022 A | * | 1/1992 | Ichikawa | 74/493 |
| 5,409,261 A | * | 4/1995 | Yamaguchi | 280/775 |
| 5,524,927 A | * | 6/1996 | Toussaint | 280/777 |
| 2002/0020244 A1 | * | 2/2002 | Janeczko et al. | 74/493 |
| 2004/0089091 A1 | * | 5/2004 | Bechtel et al. | 74/493 |
| 2004/0237695 A1 | * | 12/2004 | Sato | 74/493 |
| 2005/0016315 A1 | | 1/2005 | Breuss et al. | |

FOREIGN PATENT DOCUMENTS

| DE | 10212263 A1 | 2/2003 |
| JP | 6-16171 U | 3/1994 |

(Continued)

*Primary Examiner*—Thomas R Hannon
*Assistant Examiner*—Justin Krause
(74) *Attorney, Agent, or Firm*—Sughrue Mion, PLLC

(57) ABSTRACT

When a telescopic gear base 6 and a telescopic gear member 8 are relatively brought close to each other, although their centers shift from each other, even when a tooth tip of a tooth (first tooth) 6*a* on one surface and a tooth tip of a tooth (second tooth) 8*a* on one surface contact with each other (at C-point in FIG. 5(*b*)), the telescopic gear base 6 and the telescopic gear member 8 can continue the relative movement in direction of an arrow (FIG. 5(*b*)) from such the state, because they contact with each other and intermeshed so that each angle with their tooth continuing directions is set larger than 0° and smaller than 90°. Therefore, since the telescopic gear base 6 and the telescopic gear member 8 intermesh gradually to slide, the tooth 6*a* and the tooth 8*s* readily intermesh during slide (at D-point in FIG. 5(*c*)).

14 Claims, 21 Drawing Sheets

FOREIGN PATENT DOCUMENTS

| | | |
|---|---|---|
| JP | 6-83558 U | 11/1994 |
| JP | 7-232649 A | 9/1995 |
| JP | 8-11725 A | 1/1996 |
| JP | 8-20347 A | 1/1996 |
| JP | 9-221043 A | 8/1997 |
| JP | 10-35511 A | 2/1998 |
| JP | 2004-291782 A | 10/2004 |
| JP | 2005-1444 A | 1/2005 |

* cited by examiner

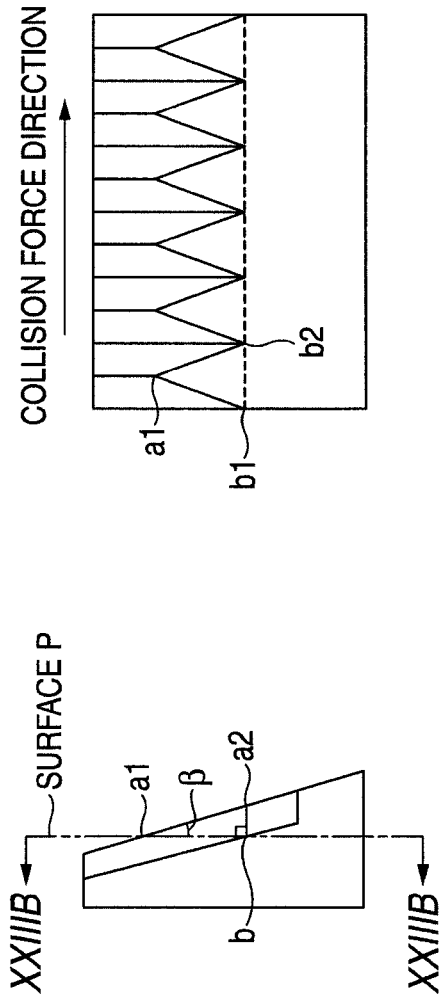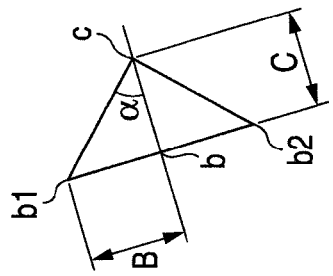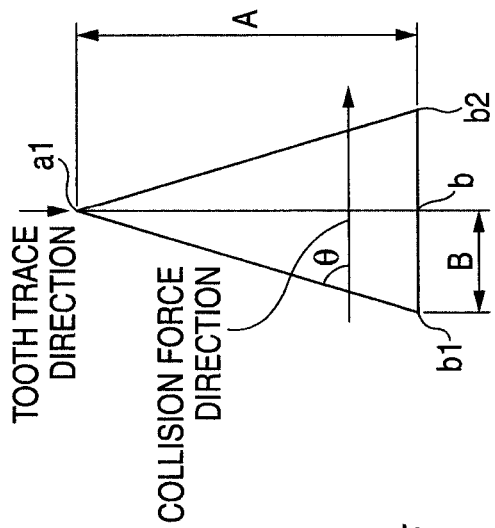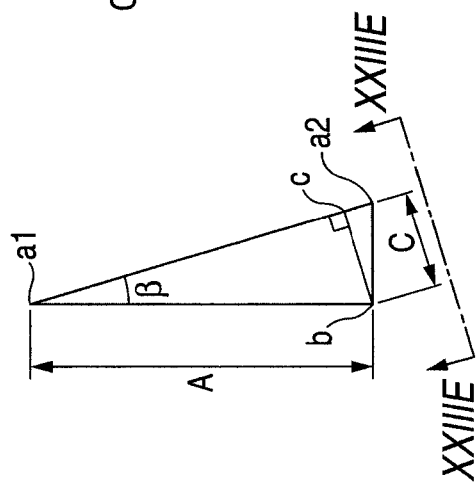
FIG. 23A
FIG. 23B
FIG. 23C
FIG. 23D
FIG. 23E

STEERING COLUMN APPARATUS

TECHNICAL FIELD

The present invention relates to a steering column apparatus which supports a steering shaft adjustably in at least one direction of a tilt direction and a telescopic direction.

BACKGROUND ART

A steering column apparatus is an important safety-maintaining part of a vehicle. In order to secure safety of a passenger in the crash time, how to control the motion of the steering column apparatus in the crash time is very important. Generally, the steering column apparatus itself is provided with an impact energy absorbing mechanism, and also performs an important part as a support member of an air bag housed in a steering wheel.

Further, in order to make a drive posture of a driver most appropriate, a general steering column apparatus, in accordance with driver's physical build and drive posture, can adjust an inclined angle of a steering wheel and can adjust a position in an axial direction of the steering wheel. Accordingly, the steering column apparatus must adjust readily the position and posture of a column body (i.e., steering wheel), and also must secure the predetermined position and posture of the column body in the crash time. Namely, the steering column apparatus requires these conflicting functions. In order to reconcile such the conflicting functions, the conventional steering column apparatus has exerted much ingenuity. However, due to increase in request for operational ease of the user, the steering column apparatus requires more improvement.

Here, in Patent Document 1, a steering column apparatus has been disclosed, which can hold a column body by means of friction force generated between superimposed many frictional plates.

Patent Document 1: JP-A-10-35511
Patent Document 2: German Patent DE-B-10212263
Patent Document 3: U.S. Patent Application Unexamined Publication 2005/0016315A1

DISCLOSURE OF THE INVENTION

However, in the mechanism in which the many frictional plates are superimposed, the constitution becomes complicated. Further, vibration generated by rubbing between the many frictional plates is readily transmitted to an operator in the tilt/telescopic adjustment time, so that there is also a problem that operational feeling becomes bad. Further, since the number of parts increases, there is also a problem that the number of assembly steps increases.

On the other hand, in Patent Document 2, a steering column apparatus has been disclosed, which disengages gears engaged with each other in the tilt/telescopic adjustment time, and engages the gears with each other after the adjustment, whereby the position of a column body can be surely held. However, In case of the mechanism in which the gears are engaged with each other to hold the position of the column body as shown in the Patent Document 2, there is a fear that poor engagement is naturally produced by the contact of tooth top between the gears when the gear are engaged with each other after the adjustment. In the Patent Document 2, though an attempt to suppress this poor engagement has been made, it is not necessarily enough.

Furthermore, in Patent Document 3, a steering column apparatus has been disclosed, which can smoothly engage one tooth energized by a spring and held movably with the other tooth after the tilt/telescopic adjustment, whereby the position of the column body can held. However, in such the constitution, there is a problem that: since one tooth is energized by the spring, the complicated and large-sized structure must be used.

Furthermore, in a steering column apparatus of type in which teeth are intermeshed with each other, in order to increase holding force which can resist force applied to a steering shaft in the crash time, it is thought that the number of intermeshed teeth is increased. However, in case that the number of intermeshed teeth is increased, the poor engagement after the adjustment of position is easily produced, so that there is a problem that installation space corresponding to the increase in the number of teeth is required.

Means to Solve the Problem

The invention has been made in view of such the conventional problems, and has an object to provide a steering column apparatus which can heighten holding force regardless of the lightweight and compact apparatus, and has good operational feeling.

According to the first aspect of the invention, in a steering column apparatus which supports a steering shaft so that the position of the steering shaft can be adjusted in at least one of a tilt direction and a telescopic direction, there is provided a steering column apparatus comprising a first tooth fixed to a vehicle body side, a column body which supports the steering shaft rotatably, and a second tooth which moves integrally with the column body. Herein, the first tooth and the second tooth intermesh with each other, thereby to position the column body to the vehicle body; the first tooth and the second tooth separate from each other, thereby to put the column body in a position-adjustable state with respect to the vehicle body; and the approach direction of the second tooth to the first tooth, from the time immediately before the first tooth intermeshes with the second tooth to the completion time of intermeshing between their teeth, is set so that each angle to their tooth continuing directions is larger than 0° and smaller than 90°, whereby the first tooth and the second tooth are brought close to each other and lastly intermesh.

According to the second aspect of the invention, in the steering column apparatus according to the first aspect, one of the first tooth and the second tooth may be provided on a pair of first inclined surfaces opposed to each other, and the other of the first tooth and the second tooth may be provided on a pair of second inclined surfaces respectively opposed to a pair of the first inclined surfaces.

According to the third aspect of the invention, in the steering column apparatus according to the second aspect, the first tooth and the second tooth, under a separate state from each other, are arranged in a state where a center surface of the first inclined surfaces defined between a pair of the first inclined surfaces and a center surface of the second inclined surfaces defined between a pair of the second inclined surfaces shift from each other.

Further, the steering column apparatus also includes a drive unit for driving the first tooth and the second toot, before the first tooth and the second tooth are intermeshed with each other, so as to bring the center surface of the first inclined surfaces and the center surface of the second inclined surfaces close to each other.

According to the fourth aspect of the invention, in the steering column apparatus according to any of the first to third aspects, by rotating and moving a lever coupled to one of the first tooth and the second tooth, one of their teeth which moves together with the lever so as to have a locus having the shape of a circular arc may be engaged with the other tooth of the first tooth and the second tooth.

According to the fifth aspect of the invention, in the steering column apparatus according to any of the first to third aspects, at least one of the first tooth and the second tooth may be formed so that the sectional area of the tooth becomes smaller toward its tip.

According to the sixth aspect of the invention, the steering column apparatus according to the first aspect of the invention further includes a bracket fixed to the vehicle body and a lever which is swingably attached to the bracket and tilt-moves together with the column body. Herein, the first tooth may be provided for the bracket fixed to the vehicle body side, and the second tooth may be provided for the lever which tilt-moves together with the column body.

According to the seventh aspect of the invention, the steering column apparatus according to the first aspect has a lever supported swingably by a bracket fixed to the vehicle body, and telescopic movement of the column body with respect to the lever is permitted with rotation of the lever. Herein, the first tooth may be provided for the lever supported on the vehicle body side, and the second tooth may be provided for the column body which moves telescopically.

According to the eighth aspect of the invention, in the steering column apparatus according to the second aspect, a pair of the first inclined surfaces may be opposite to each other at the predetermined angle and have the wedge-shape, and a pair of the second inclined surfaces may be also opposite to each other at the predetermined angle and have the wedge-shape.

According to the ninth aspect of the invention, in the steering column apparatus according to the first aspect, tooth traces of the first tooth and the second tooth may be inclined in a direction where a contact ratio increases when force is applied to the steering shaft. tooth and the second tooth, each tooth trace is inclined in a direction where a contact ratio increases in case that force is applied to the steering shaft.

According to the tenth aspect of the invention, in the steering apparatus according to the ninth aspect, tooth surfaces are arranged so as to satisfy the following conditional expression when a frictional angle between the first tooth and the second tooth is defined as $\mu$, each half-vertical angle of the first tooth and the second tooth is defined as $\alpha$, each angle of a tooth surface of the first tooth and a tooth surface of the second tooth with an intermeshing surface is defined as $\beta$, and each angle of a tooth continuing direction of the first tooth and a tooth continuing direction of the second tooth with a direction of the above force is defined as $\gamma$.

$$\mu > \tan^{-1}(\tan \alpha \cdot \sin \beta) - (90° - \gamma) \text{(conditional expression)}$$

Here, the intermeshing surface means a surface along a locus formed, when one of the first tooth and the second tooth is moved so that the contact ratio increases after the first tooth and the second tooth have intermeshed with each other, by a long axis of its one tooth.

According to the eleventh aspect of the invention, in a steering column apparatus which supports a steering shaft so that the position of the steering shaft can be adjusted in at least one of a tilt direction and a telescopic direction, there is provided a steering apparatus comprising a first tooth fixed to a vehicle body side, a column body which supports the steering shaft rotatably, and a second tooth which moves integrally with the column body. Herein, the first tooth and the second tooth intermesh with each other, thereby to position the column body to the vehicle body; the first tooth and the second tooth separate from each other, thereby to put the column body in a position-adjustable state with respect to the vehicle body; and in the first tooth and the second tooth, each tooth trace is inclined in a direction where a contact ratio increases in case that force is applied to the steering shaft.

According to the twelfth aspect of the invention, in the steering column apparatus according to the eleventh aspect, one of the first tooth and the second tooth may be provided on a pair of first inclined surfaces opposed to each other, and the other of the first tooth and the second tooth may be provided on a pair of second inclined surfaces respectively opposed to a pair of the first inclined surfaces.

According to the thirteenth aspect of the invention, in the steering column apparatus according to the eleventh aspect, a pair of the first inclined surfaces may be opposite to each other at the predetermined angle and have the wedge-shape, and a pair of the second inclined surfaces may be also opposite to each other at the predetermined angle and have the wedge-shape.

According to the fourteenth aspect of the invention, in the steering column apparatus according to the eleventh aspect, tooth surfaces may be arranged so as to satisfy the following conditional expression when a frictional angle between the first tooth and the second tooth is defined as $\mu$, each half-vertical angle of the first tooth and the second tooth is defined as $\alpha$, each angle of a tooth surface of the first tooth and a tooth surface of the second tooth with an intermeshing surface is defined as $\beta$, and each angle of a tooth trace direction of the first tooth and a tooth trace direction of the second tooth with a direction of the above force is defined as $\gamma$.

$$\mu > \tan^{-1}(\tan \alpha \cdot \sin \beta) - (90° - \gamma) \text{(conditional expression)}$$

ADVANTAGES OF THE INVENTION

In case that gear-shaped members having plural linear teeth are intermeshed, the following two examples are generally thought. As a first example, the teeth of their gear-shaped members are opposed to each other in a normal line direction in relation to each tooth trace, and thereafter the gear-shaped members are moved in parallel thereby to intermesh the gear-shaped members. As a second example, the teeth of the gear-shaped members opposed to each other are moved in a tangent line direction of each tooth trace in parallel thereby to intermesh the gear-shaped members. In any example, the teeth of the gears intermeshing with each other, or leading ends of the tooth traces come into contact with each other, the possibility of causing poor intermeshing becomes high. Here, the "normal line direction of tooth trace" means a normal line extending from the tooth trace in relation to an imaginary surface including plural tooth traces in the same gear members.

To the contrary, according to the steering column apparatus of the invention, the first tooth and the second tooth are brought close to each other in other direction than the normal line direction and the tangent line direction (including a direction parallel to the tangent line) in relation to their respective tooth traces, and intermeshed. Therefore, the poor intermeshing between the first tooth and the second tooth can be suppressed. Accordingly, it is avoided that the operational feeling becomes bad as the case where the many frictional plates are used. Further, after the first tooth and the second tooth have intermeshed, large holding force can be exhibited. Particularly, in order to perform the smooth intermeshing, it is preferable that the contact ratio is increased while the first tooth and the second tooth are being slid in their tooth continuing directions after first intermeshing between the first tooth and the second tooth has been started, smooth intermeshing can be performed. In the specification of the invention, the "telescopic direction" means an axial direction of the steering shaft, and the "tilt direction" means a direction orthogonal to its telescopic direction (particularly means an up-down direction).

Further, in case that the first tooth and the second tooth are respectively formed on both tapered surfaces opposed to each other, stronger holding force can be exhibited by intermeshing of the teeth on the both surfaces.

Further, in the separating state, the center surface of the tapered surfaces of the first tooth shifts from the center surface of the tapered surface of the second tooth. In case that there is provided the drive unit which drives the first tooth and the second tooth so as to bring the center surface of the tapered surfaces of the first tooth and the center surface of the tapered surfaces of the second tooth close to each other in the intermeshing time, more smooth intermeshing can be realized.

When one of the first tooth and the second tooth which moves in the shape of a circular arc together with the lever by rotating and moving the lever coupled to one tooth engages with the other of the first tooth and the second tooth, the sure operation can be realized with simple constitution.

It is preferable that at least one of the first tooth and the second tooth becomes smaller in its sectional area toward its leading end, because the first tooth is easy to intermesh with the second tooth.

According to the steering column apparatus of the invention, the tooth traces of the first tooth and the second tooth are inclined in the direction where the contact ratio increases when force is applied to the steering shaft in the crash time. Therefore, the larger the impact force applied to the steering shaft is, the higher the contact ratio becomes, so that the holding force can be improved. Further, even in case that the number of teeth is set small, the holding force can be secured. Therefore, there is also an advantage that the good operational feeling can be secured regardless of the lightweight and compact apparatus.

Further, in case that one of the first tooth and the second tooth is formed on the tapered surfaces opposed to each other, and the other of them is formed on the tapered surfaces facing in opposite directions, the contact ratio can be increased at the crash time.

Further, by setting the tooth surface angles α, β, γ and θ by a three-dimensionally predetermined relational expression so that θ does not exceed the frictional angle, it is possible to prevent the intermeshing length in the tooth continuing direction from decreasing and the contact ratio from lowering. In result, an advantage that the intermeshing teeth never disengage from each other also when the excessive load is applied is obtained.

BRIEF DESCRIPTION OF THE DRAWINGS

FIGS. 11(a) to 11(g) are diagrams showing machining states of the telescopic gear member 8 in order of manufacturing step;

FIG. 13 is a diagram showing a die for machining the telescopic gear member 8, in which

FIG. 23A is a side view of a gear member in the third embodiment when an inclined angle of a tooth surface is set at β°, and an inclined angle of a tooth trace is set at 0°;

FIG. 23B is a front view of the gear member viewed in the left direction of FIG. 23A;

FIG. 23C is a main portion enlarged view of FIG. 23A;

FIG. 23D is a main portion enlarged view of FIG. 23B;

FIG. 23E is a diagram viewed in the direction of an arrow XXIII in FIG. 23C;

BEST MODE FOR CARRYING OUT THE INVENTION

Tilt-telescopic steering column apparatuses according to embodiments of the invention will be described below with reference to drawings.

First Embodiment

Figure 1:
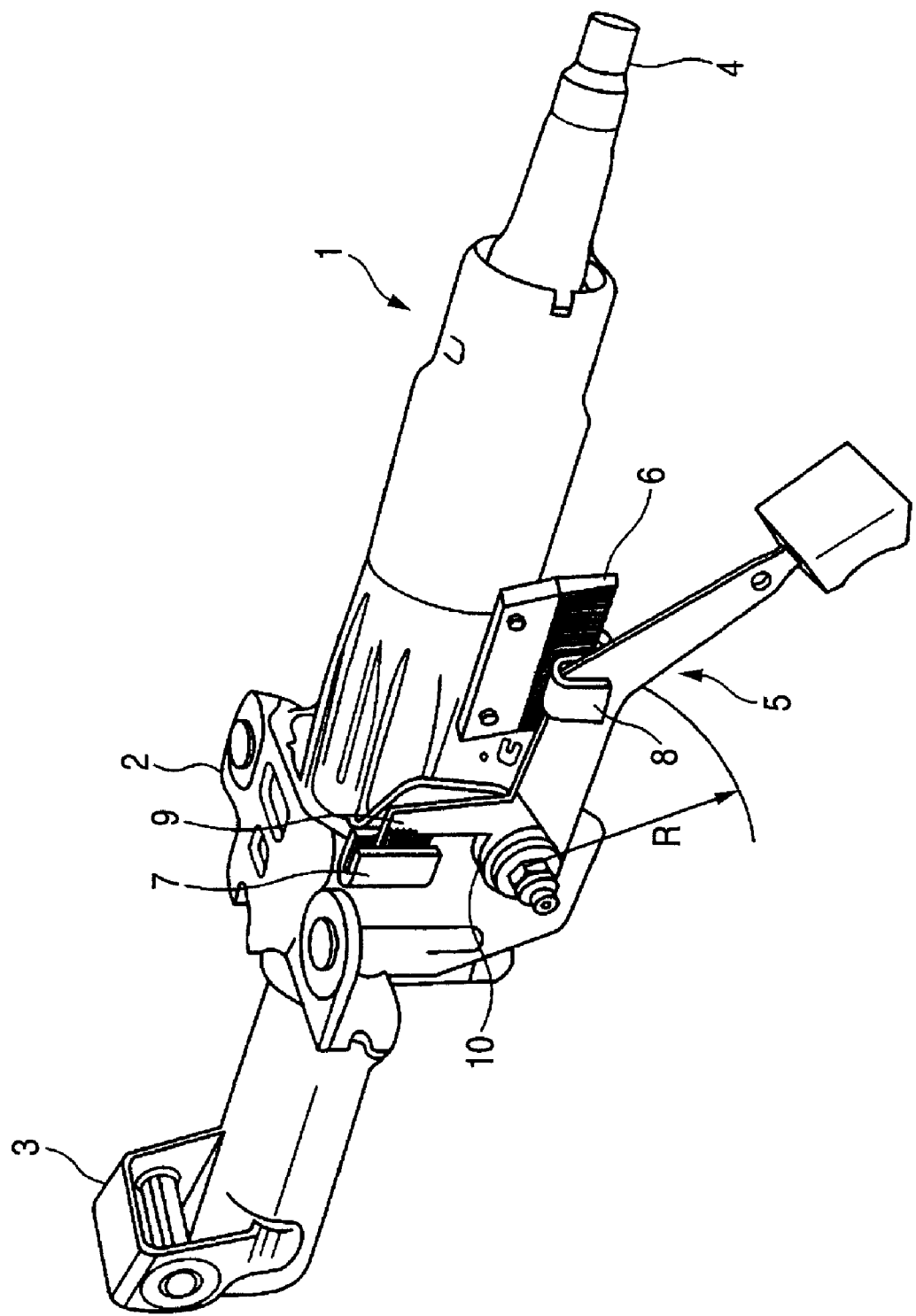
FIG. 1 is a perspective view of a steering column apparatus according to an embodiment of the invention.
Figure 2:
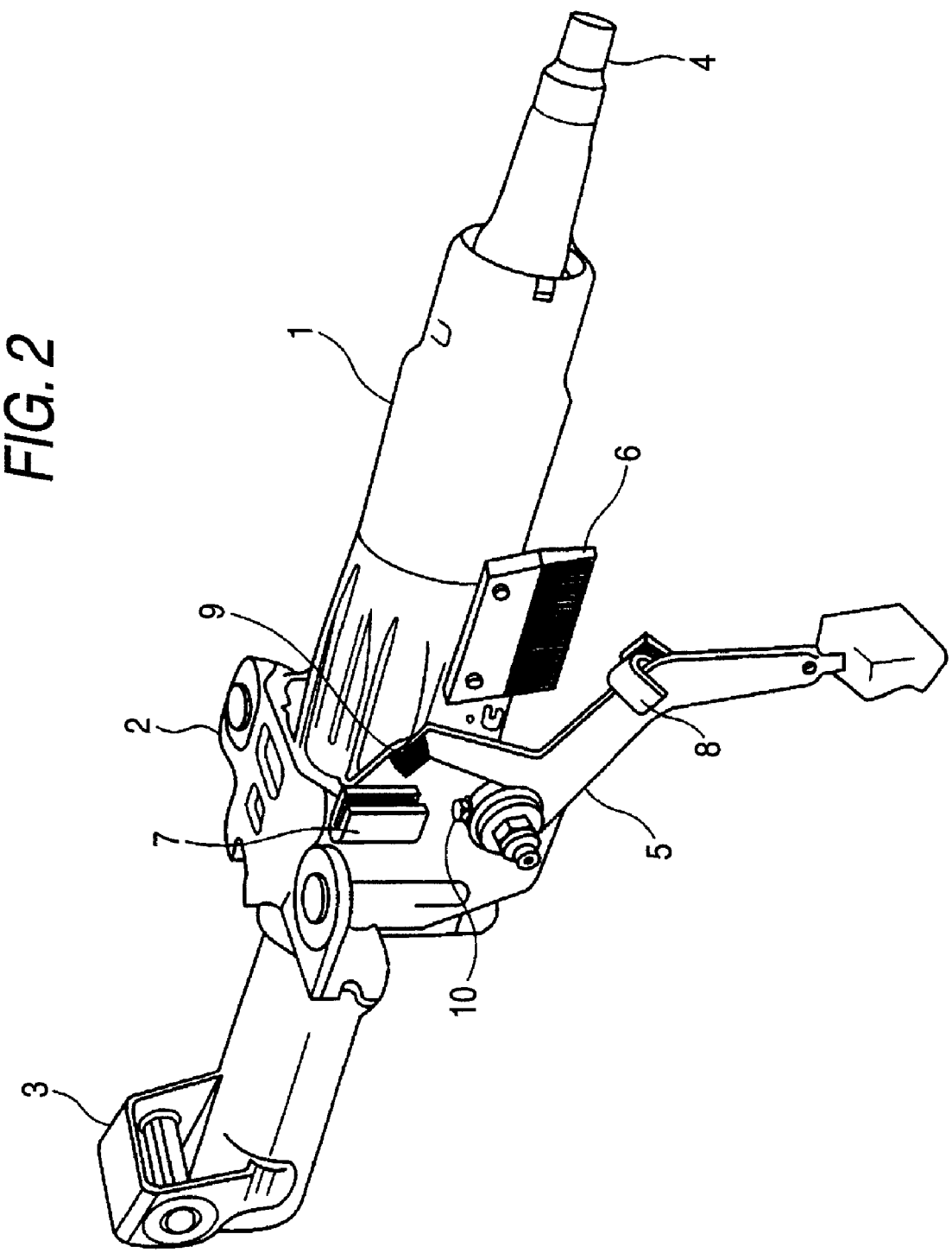
FIG. 2 is a perspective view of a steering column apparatus according to a modified example of the invention.

FIGS. 1 and 2 are perspective views of a steering column apparatus according to a first embodiment of the invention, in which FIG. 1 shows a locked state and FIG. 2 shows an unlocked state.

A cylindrical column body 1 is attached to a vehicle body (not shown) through brackets 2 and 3. Into the column body 1, a steering shaft 4 for coupling a steering wheel and a steering mechanism (which are not shown) is inserted, and supported rotatably by a not-shown bearing.

To a side portion of the column body 1, a plate-shaped telescopic gear base 6 is fixed, while a plate-shaped tilt gear base 7 is fixed to the bracket 2. The telescopic gear base 6 has a length corresponding to an adjustment width in the telescopic direction of the column body 1. Further, the tilt gear base 7 has a length corresponding to an adjustment width in the tilt direction of the column body 1. The column body 1 has a long hole for telescopic slide.

To a rotatable shaft 5a which penetrates into a long hole (not shown) extending in the tilt direction provided in the bracket 2 and a long hole extending in the telescopic direction provided in the column body 1, an operational lever 5 is attached. To the operational lever 5, a telescopic gear member 8 is fixed correspondingly to the telescopic gear base 6, and a tilt gear member 9 is formed integrally with the operational lever 5 correspondingly to the tilt gear base 7.

At the base of the operational lever 5, a cam-type rotary clamp mechanism 10 is provided. The cam-type rotary clamp mechanism 10 has a function of positioning the tilt/telescopic steering column by generating clamping force by a cam effect produced by operating the operation lever 5. Further, a stopper function for the operational lever 5 may be provided for the cam-type rotary clamp mechanism 10, whereby a gear contact ratio between the gear base and gear member can be also controlled. Therefore, moderation operational feeling can be obtained.

When the operational lever 5 is rotated to the position shown in FIG. 1, the telescopic gear member 8, while moving in the shape of a circular arc, intermeshes with the telescopic gear base 6, and the tilt gear member 9 intermeshes with the tilt gear base 7. To the contrary, the operational lever 5 is rotated to the position shown in FIG. 2, the telescopic gear member 8, while moving in the shape of a circular arc, separates from the telescopic gear base 6, and the tilt gear member 9 separates from the tilt gear base 7.

Figure 3:
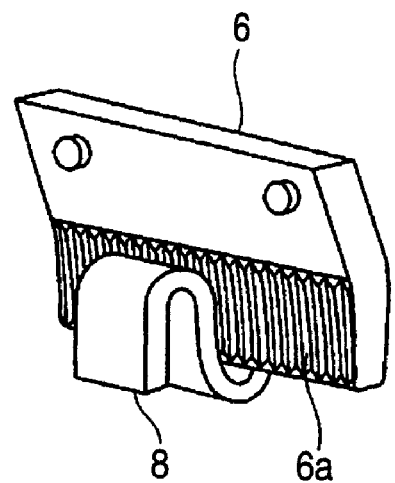
FIG. 3 is a perspective view of a telescopic gear base 6 and a telescopic gear member 8 under an intermeshing state.
Figure 4:
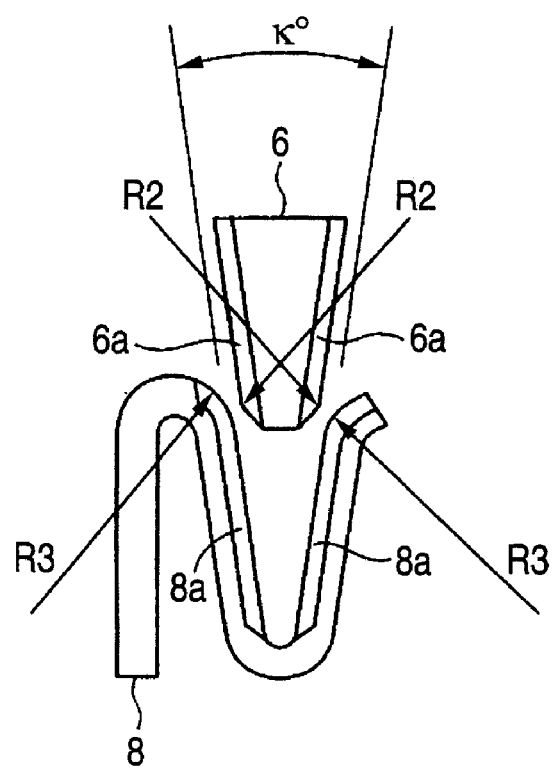
FIG. 4 is a sectional view of the telescopic gear base 6 and the telescopic gear member 8 under a separating state.

FIG. 3 is a perspective view of the telescopic gear base 6 and the telescopic gear member 8 under an intermeshing state. Herein, the telescopic gear member 8 is put in a positioned state with relative to the vehicle body. FIG. 4 is a sectional view of the telescopic gear base 6 and the telescopic gear member 8 under a separating state. The telescopic gear base 6 has plural teeth (first tooth) 6a on both outer surfaces of a tapered surface which becomes narrower towards downward, and the telescopic gear member 8 has plural teeth (second tooth) 8a on both inner surfaces of a tapered surface which becomes wider towards upward, at the same pitch as a pitch of the teeth 6a.

In this embodiment, a tapered angle k of each tapered surface in the telescopic gear base 6 and the telescopic gear member 8 is set at 9°. However, as long as the tapered angle is an acute angle of 0° or more, any angle may be set. Further, the end portion (lower end in the figure) of the tooth 6a of the telescopic gear base 6 is contoured with a radius of curvature R2, and the end portion (upper end in the figure) of the tooth 8a of the telescopic gear member 8 opposed to the tooth 6a is contoured with a radius of curvature R3. Hereby, the tapered surfaces are readily fitted to each other. In the embodiment, although the end portions of the tooth 6a and 8a are contoured by the circular arc, radiuses of curvature at the end portions are arbitrary, or it is not necessarily required to set such that. Further, the end portions of the teeth 6a and 8a may be contoured not by the circular arc but by a straight line. In this case, it is desirable that the tooth trace and the straight line are connected by a circular arc having an arbitrary radius of curvature.

Further, it is preferable that tooth traces of the telescopic gear base 6 and the telescopic gear member 8 are formed in the shape of a circular arc having a radius of curvature R (FIG. 1) with a clamp rotation shaft of the operational lever 5 as a center. Since the telescopic gear member 8 is fixed to the operational lever 5, the moving axis trace of the tooth 8a of the telescopic gear member 8 becomes a circular arc. Therefore, by forming the tooth traces of the telescopic gear base 6 and the telescopic gear member 8 in the shape of a circular arc having the same radius R, the operational feeling improves when the teeth 6a and 8a intermesh with each other.

FIG. 5 is a sectional view of the telescopic gear base and the telescopic gear member 8 from the separating state to the intermeshing state. With reference to FIG. 5, the intermeshing operation between the telescopic gear base 6 and the telescopic gear member 8 will be described. First, in the separating state, the tooth 6a of the telescopic gear base 6 and the tooth 8a of the telescopic gear member 8 which are opposed to each other are put in a state where the directions of their tooth traces are obliquely opposed to each other (FIG. 5 (a)).

Figure 5A:
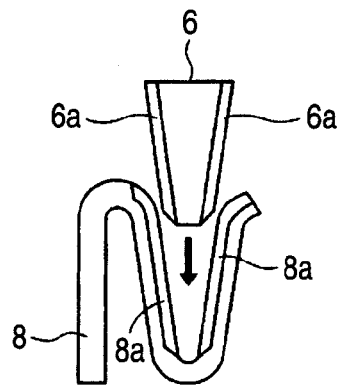
FIGS. 5(a) to 5(e) are sectional views of the telescopic gear base 6 and the telescopic gear member 8 from the separating state to the intermeshing state.
Figure 5D:
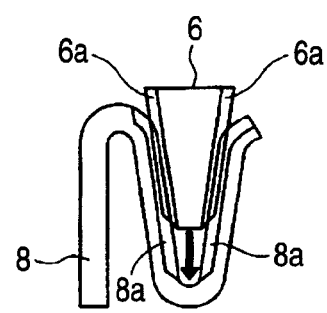
Figure 5B:
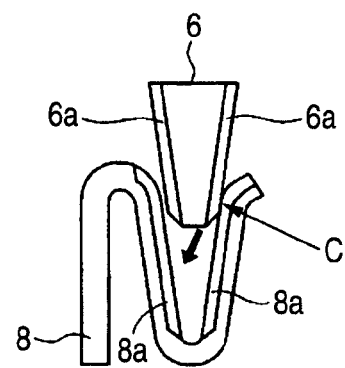

When the telescopic gear base 6 and the telescopic gear member 8 are brought relatively close to each other from this state, in case that their centers are shifted from each other, the tip of the tooth 6a on one surface and the tip of the tooth 8a on one surface come into contact with each other (at a C-point in FIG. 5(b)). However, since the telescopic gear base 6 and the telescopic gear member 8 are brought close to each other in other directions than the normal line direction and the tangent line direction in relation to the respective tooth traces and intermeshed with each other, even after the telescopic gear 6 and the telescopic gear member 8 have come into contact with each other at the C-point, they can continue the relative movement in the direction of an arrow (FIG. 5(b)), and gradually intermesh with each other while sliding. Therefore, during this slide, the tooth 6a and the tooth 8a can be readily intermesh with each other (D-point in FIG. 5(c)). Namely, from the time just before the telescopic gear base 6 and the telescopic gear member 8 intermesh with each other to the time of completing their intermeshing (from FIG. 5(a) to FIG. 5(e)), an angle of the approach direction between the telescopic gear base 6 and the telescopic gear member 8 makes with each tooth continuing direction is set so as to be larger than 0° and smaller than 90°. The both members are thus brought relatively close to each other thereby to achieve intermeshing.

Figure 5E:
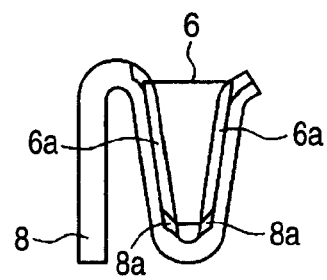
Figure 5C:
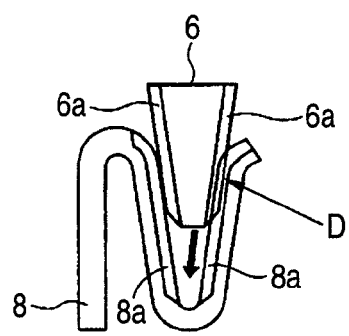

When the tooth 6a and the tooth 8a on one surface have intermeshed with each other, its intermeshing works as guide, and the tooth 6a and the tooth 8a on the other surface can also intermesh readily with each other (FIGS. 5(d), 5(e)). Thus, in the intermeshing between the tooth 6a and the tooth 8a according to the embodiment, compared with intermeshing of the conventional gears, possibility of obstructing the movement of the gears due to the contact between the tooth tips is low, with the result that the operational feeling of the operational lever 5 improves.

In the first embodiment, with the rotation of the operational lever 5, the telescopic gear member 8 attached integrally to the operational lever 5 is intermeshed with the telescopic gear base 6. Therefore, by transmitting the force applied to the operational lever 5 directly to the telescopic gear member 8, intermeshing can be surely performed. Further, since the rotating amount of the operational lever 5 becomes the intermeshing amount between the telescopic gear base 6 and the telescopic gear member 8 as it is, fixing of the column body 1 can be surely realized regardless of the simple constitution.

Though the intermeshing operation between the telescopic gear base 6 and the telescopic gear member 8 has been described above, the intermeshing operation between the tilt gear base 7 and the tilt gear member 9 is basically similar to that between the telescopic gear base 6 and the telescopic gear member 8.

Figure 6:
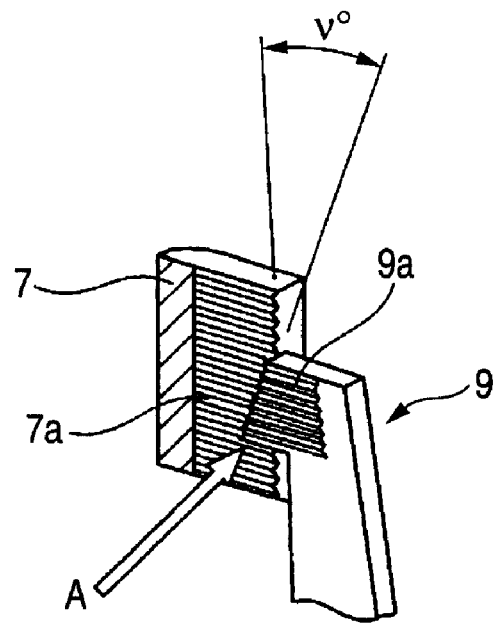
FIG. 6 is a perspective view showing a relation between a tilt gear base 7 and a tilt gear member 9.

FIG. 6 is a perspective view showing a relation between the tilt gear base 7 and the tilt gear member 9. In order to facilitate the description, the tilt gear base 7 is shown in a half-cut state. The tilt gear base 7 has plural teeth (first tooth) 7a on both inner surfaces of a tapered surface which becomes narrower leftward in the figure, and the tilt gear member 9 has plural teeth (second tooth) 9a on both outer surfaces of a tapered surface which becomes wider rightward in the figure, at the same pitch as a pitch of the teeth 6a. Further, in the embodiment, in the tilt gear member 9, a tip of a tooth trace of the teeth 9a is formed uniformly in the shape having an inclined angle of v=5° with an array of tips of the teeth 7a of the tilt gear base 7.

In the intermeshing time, in case that the teeth 9a of the tilt gear member 9 starts intermeshing with the teeth 7a of the tilt gear base 7, they starts intermeshing from a point A in FIG. 6. Namely, the intermeshing between the teeth 7a and 9a starts from one tooth, and a tooth adjacent to its tooth intermeshes in order, whereby it is possible to make an occurrence ratio of poor intermeshing small.

In the above first embodiment, though the inclined angle is set at v=5°, as long as the intermeshing between the gears starts from one tooth, its inclined angle and the tip shape of the tooth are not limited. Such the constitution can be applied similarly to the telescopic gear base 6 and the telescopic gear member 8. Further, in the embodiment, though the telescopic gear base 6 and the telescopic gear member 8, and the tilt gear base 7 and the tilt gear member 9 are provided on only one side of the column body 1, the same constitution may be provided on both sides of the column body 1. Hereby, the lock-proof strength redoubles and symmetrical property increases, whereby the operation can be stabilized more.

Figure 7:
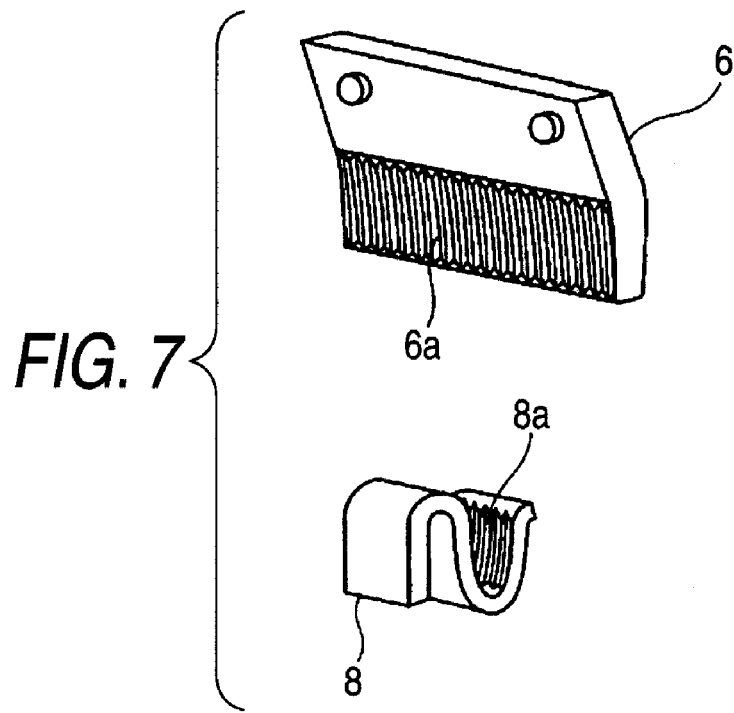
FIG. 7 is a perspective view showing a modified example of the telescopic gear base 6 and the telescopic gear member 8 according to the embodiment.

FIG. 7 is a perspective view showing a modified example of the telescopic gear base 6 and the telescopic gear member 8 according to the above first embodiment. In the modified example of FIG. 7, the tooth traces of the teeth 6a of the telescopic gear base 6 and the teeth 8a of the telescopic gear member 8 are formed not in the shape of a circular arc but in the shape of a straight line, whereby readiness of molding is heightened. Such the constitution can be applied similarly to the tilt gear base 7 and the tilt gear member 9.

Figure 8:
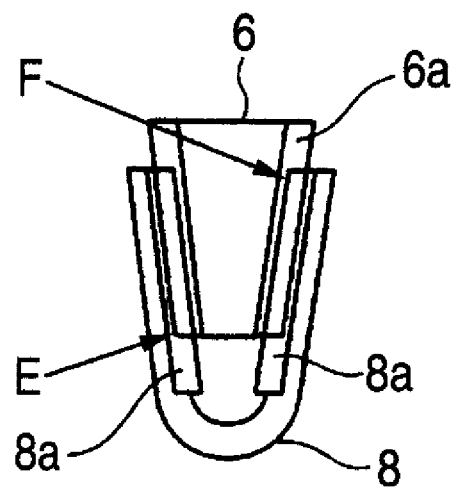
FIG. 8 is a sectional view showing a modified example of the telescopic gear base 6 and the telescopic gear member 8 according to the embodiment.

FIG. 8 is a sectional view showing a modified example of the telescopic gear base 6 and the telescopic gear member 8 according to the above first embodiment. In the modified example of FIG. 8, the end portions (points E and F) of the tooth 6a of the telescopic gear base 6 and the tooth 8a of the telescopic gear member 8 are not contoured by the circular arc or the straight line but are formed in the simple shape, whereby readiness of molding is heightened. Such the constitution can be applied similarly to the tilt gear base 7 and the tilt gear member 9.

Figure 9:
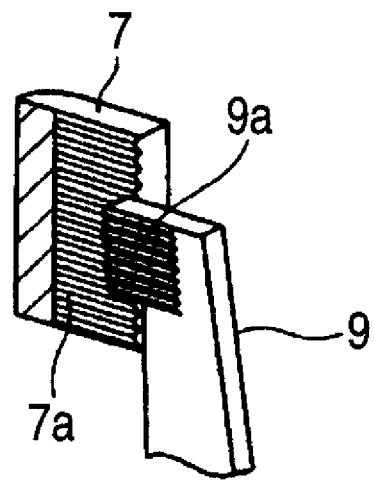
FIG. 9 is a sectional view similar to FIG. 6, showing a modified example of the tilt gear base 7 and the tilt gear member 9 according to the embodiment.

FIG. 9 is a sectional view similar to FIG. 6, showing a modified example of the tilt gear base 7 and the tilt gear member 9 according to the above first embodiment. In the modified example of FIG. 9, in the tilt gear member 9, the tip shape of the tooth trace of the teeth 9a is aligned in parallel with an array of the tip shape of the teeth 7a of the tilt gear base 7 (namely, inclination v=0°). Such the constitution can be applied similarly to the telescopic gear base 6 and the telescopic gear member 8.

Figure 10:
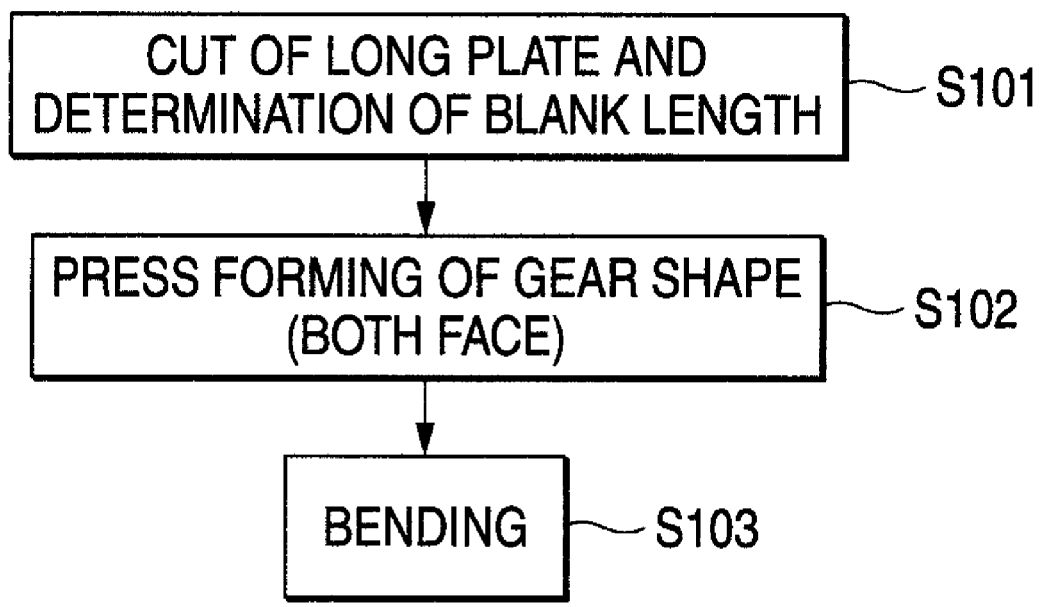
FIG. 10 is a flowchart showing a manufacturing method of the telescopic gear base 6 and the telescopic gear member 8.

FIG. 10 is a flowchart showing a manufacturing method of the telescopic gear base 6 and the telescopic gear member 8 by a press molding method. FIG. 11 shows machining states of the telescopic gear member 8 by a rolling form method in order of manufacturing step. FIG. 12 shows machining states of the telescopic gear base 6 in order of manufacturing step. FIG. 13 is a diagram showing a die for machining the telescopic gear member 8, in which FIG. 13(a) is a top view of the die, and FIG. 13(b) is a side view of the die.

Figure 13A:
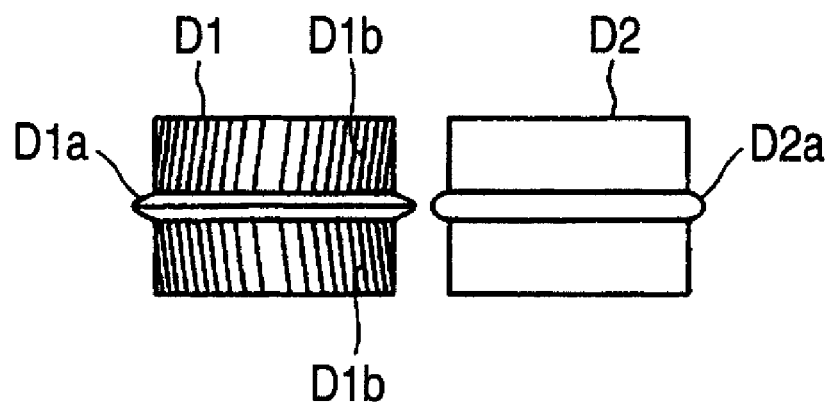
FIG. 13(a) is a top view of the die.

In FIG. 13(a), a first die D1 has the cylindrical shape. In the die D1, a projection D1a which continues in the circumferential direction is formed in the center, and teeth D1b which line in the circumferential direction are formed on both sides of the projection D1a. On the other hand, a second die D2 has the cylindrical shape. In the die D2, a projection D2a which continues in the circumferential direction is formed in the center, and both sides of the projection D2a are cylindrical surfaces. As shown in FIG. 13(b), between the dies D1 and D2 which rotate in the reverse direction to each other, a plate material B is inserted, thereby to subject such the plate material B to the predetermined machining.

A method of manufacturing the telescopic gear member 8 according to the embodiment will be described. First, in a step S101 of FIG. 10, a long plate material is cut to determine a blank length, and a material B is formed (refer to FIG. 11(a) which is a top view). In a succeeding step S102, the plate material B is inserted between the dies D1 and D2 shown in FIG. 13, being out of center, whereby teeth 8a and grooves 8c, 8d are formed by rolling forming (refer to FIG. 11(b) which is a top view and FIG. 11(c) which is a side view).

Figure 11A:
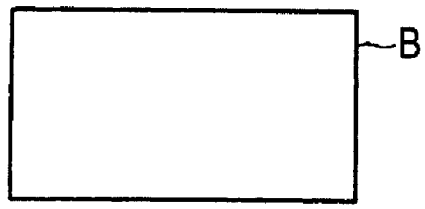
Figure 11B:
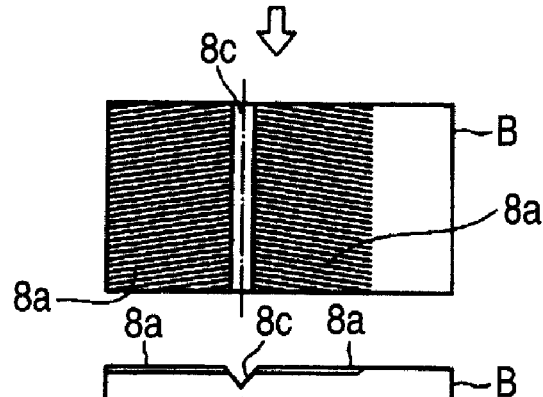
Figure 11E:
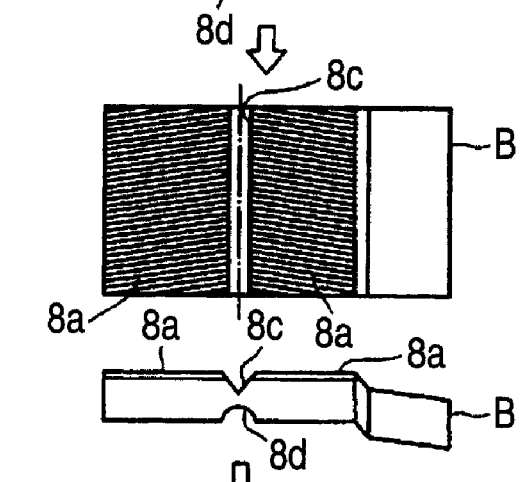
Figure 11F:
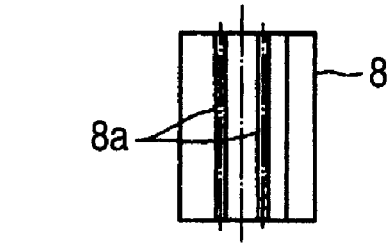
Figure 11G:
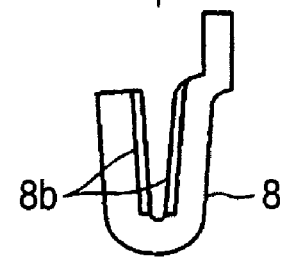

Further, in a step S103, an end side of the plate material B in which the teeth 8a have not been formed is bent (refer to FIG. 11(d) which is a top view and FIG. 11(e) which is a side view)). Thereafter, the plate material B is bent nearly in the U-shape with the grooves 8c and 8d as a center, thereby to obtain a telescopic gear member 8 (refer to FIG. 11(f) which is a top view and FIG. 11(g) which is a side view)).

On the other hand, machining of the telescopic gear base 6 uses two first dies D1. A method of manufacturing the telescopic gear base 6 according to the embodiment will be described. First, in a step S101 of FIG. 11, a long plate material is cut to determine a blank length, and a material B is formed (refer to FIG. 12(a) which is a top view). In a succeeding step S102, the plate material B is inserted between the dies D1 and D2 shown in FIG. 13, with a center of the plate material B between the dies, whereby teeth 6a and grooves 6c, 6d are formed by roll forming (refer to FIG. 12(b) which is a top view and FIG. 12(c) which is a side view).

Figure 12A:
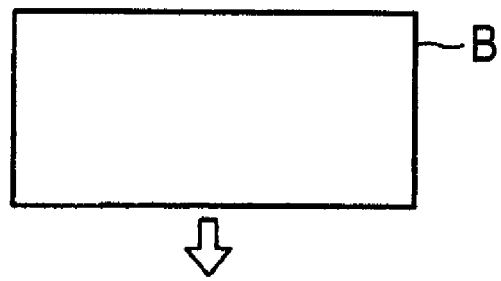
FIGS. 12(a) to 12(e) are diagrams showing machining states of the telescopic gear base 6 in order of manufacturing step.
Figure 12B:
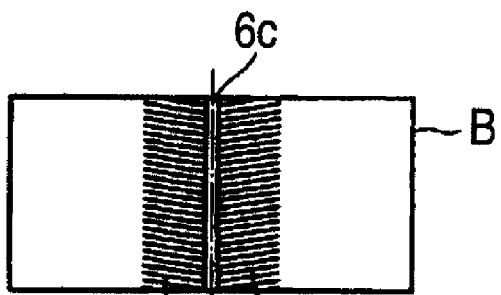
Figure 12C:
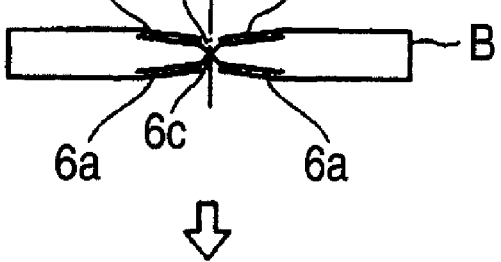
Figure 12D:
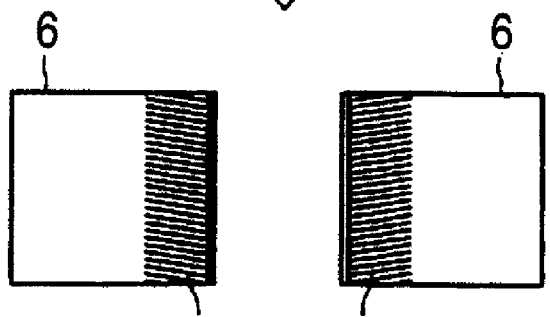
Figure 12E:
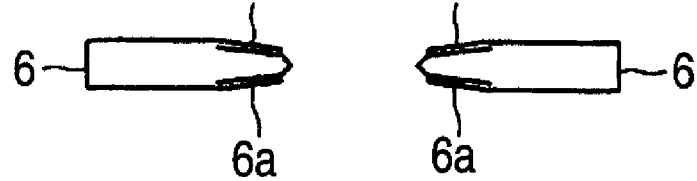
Figure 13B:
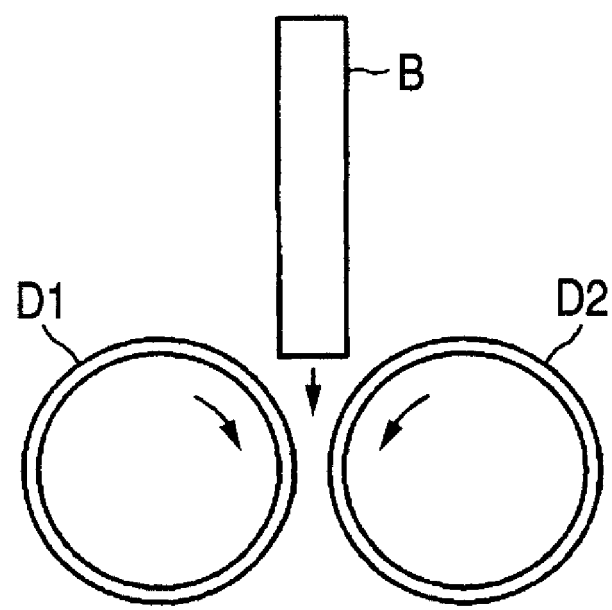
FIG. 13(b) is a side view of the die.

Further, in the step S103, the grooves 6c, 6c of the plate material B opposed to each other are cut, thereby to obtain a telescopic gear base 6 (refer to FIG. 12(d) which is a top view and FIG. 12(e) which is a side view). In such the case, two telescopic gear bases 6 are formed by machining at a time.

This machining method can be similarly applied to the tilt gear base 7 and the tilt gear member 9.

Though the gear base or the gear member is molded by sheet metal pressing in the above examples, any molding method can be applied, for example, green compact molding, injection molding, casting such as die casting and Thixo molding, plastic working, or cutting. Further, though the gear members 8 and are moved simultaneously by the operational lever 5, they may be individually moved by separate operational levers. Further, as a molding method of a wedge-shaped gear member, there is a method in which a gear is molded integrally when a column body or a tilt bracket (side fixed to a vehicle body) is manufactured by die casting.

Figure 14:
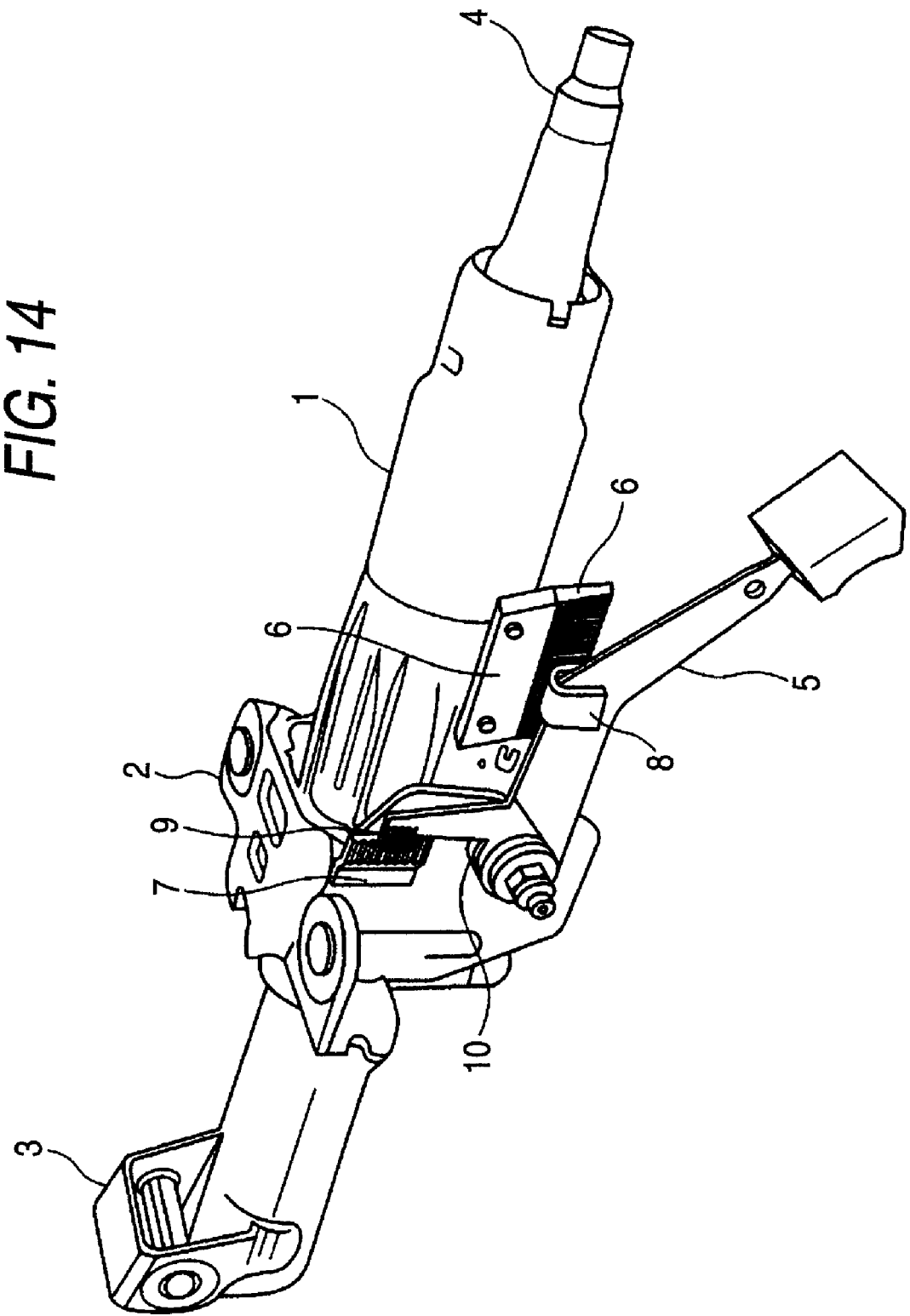
FIG. 14 is a perspective view of a steering column apparatus according to a modified example.

FIG. 14 is a perspective view of a steering column apparatus according to a modified example. In this modified example, a telescopic gear base 6 and a telescopic gear member 8 have respectively teeth 6a, 8a on only one surface, and their teeth 6a, 8a are intermeshed. Further, a tilt gear base 7 and a telescopic gear member 9 have respectively teeth 7a, 9a on only one surface, and their teeth 7a, 9a are intermeshed. Further, in only any one set of the telescopic gear base 6 and the telescopic gear member 8 or a set of the tilt gear base 7 and the telescopic tilt gear member 9, teeth may be formed on only one surface.

Though the telescopic gear base 6, the telescopic gear member 8, and the tilt gear base 7 are formed separately from a column body 1 and an operational lever 5, they may be formed integrally with the column body 1 and the operational lever 5. A tooth form is module 0.5, which is common to the above examples. However, even in case that the module is large or small, there is no problem. Further, when the module is made much smaller, tooth surface property approximates surface property of a plane plate. However, even if the tooth surface property is the plane property, a position holding effect is obtained by friction, so that the holding function of the steering column apparatus according to the invention acts.

Figure 15:
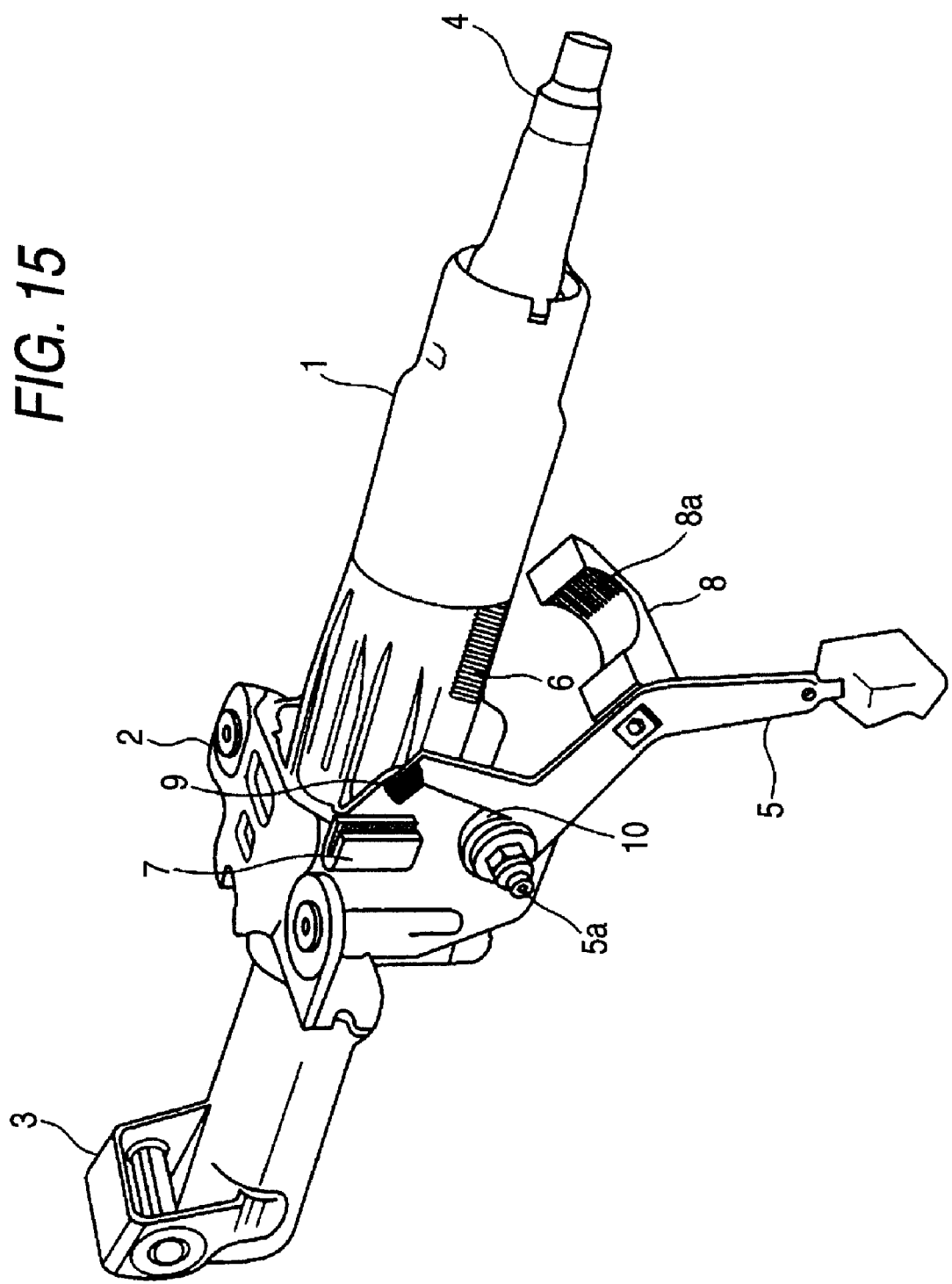
FIG. 15 is a perspective view of a steering column apparatus according to a modified example.

FIG. 15 is a perspective view of a steering column apparatus according to a modified example. In this modified example, a telescopic gear base 6 is formed integrally with a column body 1, that is, teeth 6 are formed on both side surfaces of the column body 1. On the other hand, a telescopic gear member 8 is formed in the shape of a plate which has one end bolted to an operational lever 5 and a semi-cylindrical inner surface, and the telescopic gear member 8 has teeth 8 in positions on the inner surface corresponding to the teeth 6a. When the operational lever 5 is moved from the position shown in FIG. 15 counterclockwise, the telescopic gear member 8 wraps a lower half portion of the column body 1, whereby the teeth 6a and the teeth 8a intermesh with each other.

Figure 16:
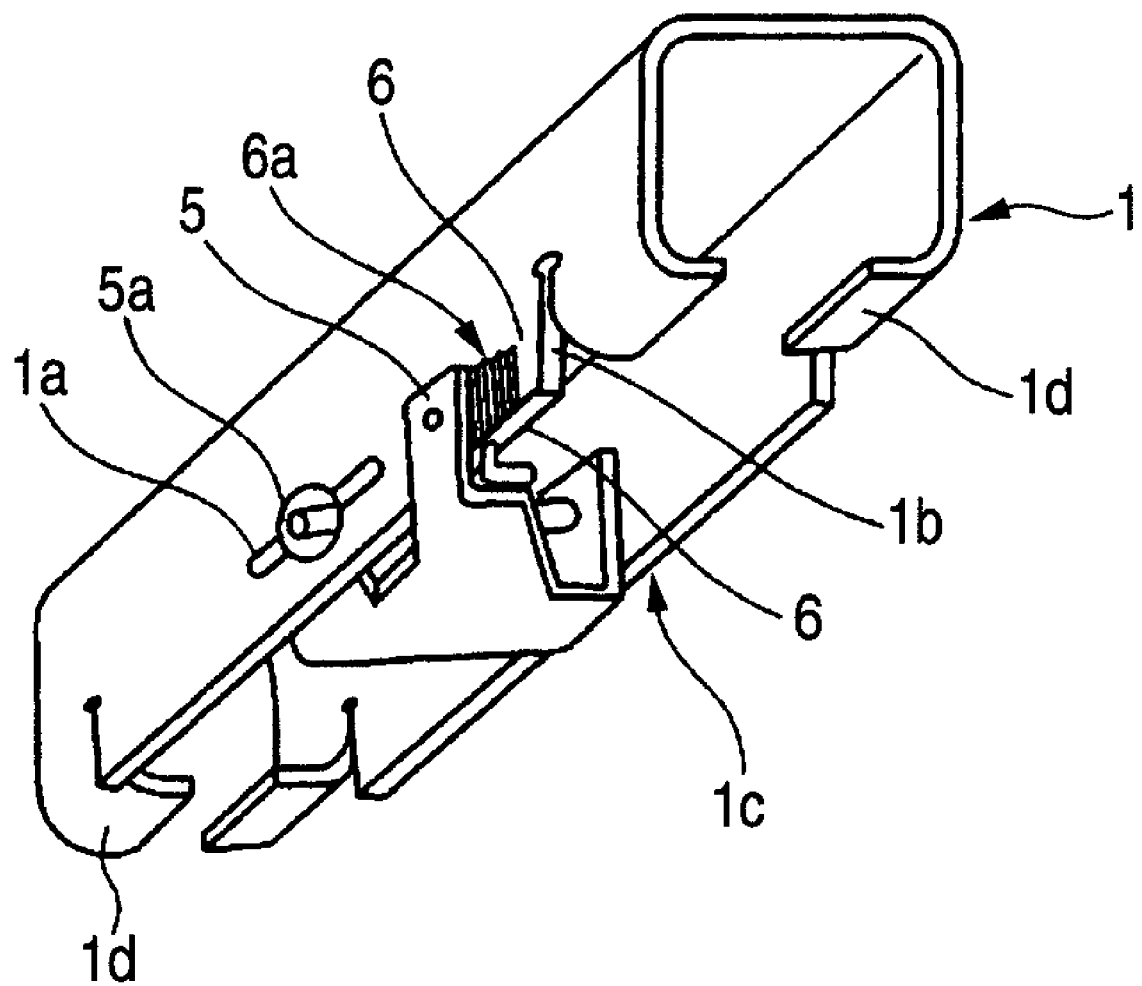
FIG. 16 is a perspective view of a column body of a steering column apparatus according to a modified example.

FIG. 16 is a perspective view of a column body of a steering column apparatus according to a modified example. In this modified example, a column body 1 is formed by sheet metal pressing. The column body 1 is molded, in order to secure readiness in molding and weight reduction, by being blanked from a plane plate and bent so as to be rounded. In this modified example, a telescopic gear base 6 is formed integrally with one side edge 1b of the column body 1. Namely, since teeth 6a are formed on both sides of the side edge 1b of the plane plate before the sheet metal pressing, the manufacture is easy.

An operational lever 5 can be driven around a shaft 5a which is movable along a long hole 1a extending in the axial direction, and teeth (not shown) formed at a part of the operational lever 5 intermesh with teeth 6a. The telescopic gear base 6 may be provided at the other side edge 1c of the column body 1, or may be provided at both side edges thereby to secure high holding force. Regardless of the side edge 1b or 1c where the telescopic gear base 6 is formed, both ends of the column body 1 are rounded inward, whereby holding parts 1d, 1d of a bearing (not shown) which supports a steering shaft 4 rotatably can be formed. Therefore, it is possible to provide a steering column apparatus at a low cost.

FIG. 17 is a sectional view of a telescopic gear base 6 and a telescopic gear member 8 according to another embodiment. In the embodiment, an operational lever 5 to which the telescopic gear base 6 is coupled is fixed to a shaft 5a, and rotates integrally with the shaft 5a. A rotary cam 5b is attached to the shaft 5a, while a fixed cam 5c is attached to a not-shown column body. According to rotation of the shaft 5a, the rotary cam 5b rotates with respect to the fixed cam 5c. The shaft 5a, in FIG. 17, is urged in the right direction by preload. The rotary cam 5b and the fixed cam 5c constitute a drive unit.

Figure 17A:
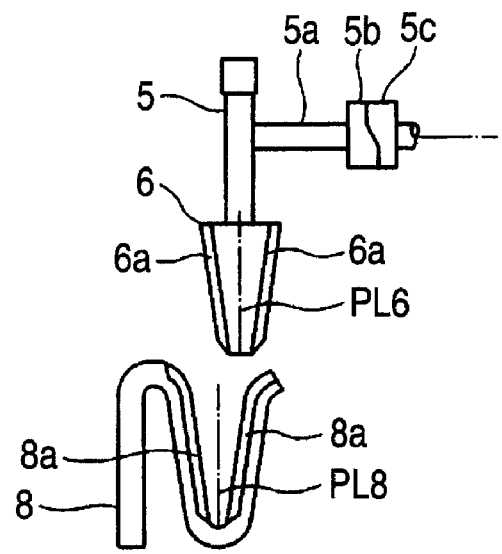
FIGS. 17(a) to 17(c) are sectional views of a telescopic gear base 6 and a telescopic gear member 8 according to another embodiment.

When a center surface (extending vertically to a paper surface) of tapered surfaces on both sides of the telescopic gear base 6 is taken as PL6, and a center surface (extending vertically to a paper surface) of tapered surfaces on both sides of the telescopic gear member 8 is taken as PL8, in a separating state shown in FIG. 17(a), the center surface PL6 is out of the center surface PL8 in the axial direction of the shaft 5a.

Figure 17B:
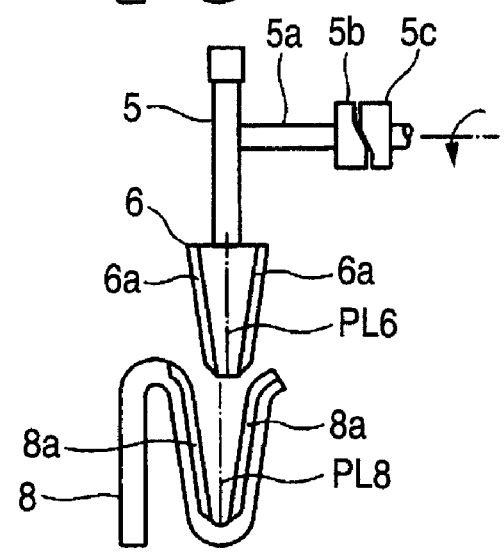
Figure 17C:
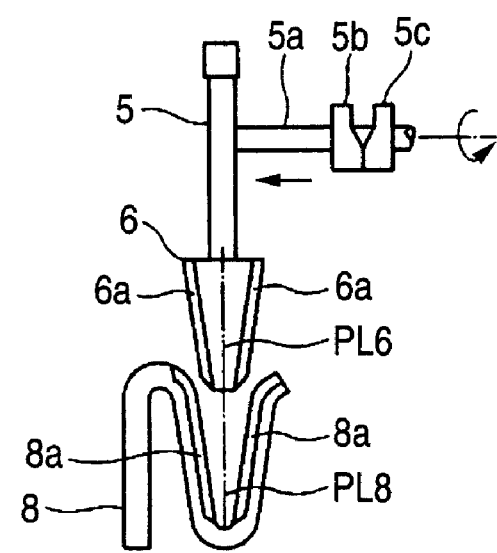

When the operational lever 5 is rotated as shown in FIG. 17(b), the cam portion of the rotary cam 5b rotating together with the shaft 5a starts coming on the cam portion of the fixed cam 5c, and the shaft 5a moves to the left in the figure. When the operational lever 5 is rotated further, the cam portion of the rotary cam 5b completely comes on the cam portion of the fixed cam 5c, so that the shaft 5a moves to the position shown in FIG. 17(c). Under such the state, the center surface PL6 and the center surface PL8 come in a position where they are superimposed on each other. Further, when the operational lever 5 is rotated more, the telescopic gear base 6 and the telescopic gear member 8 intermesh with each other (refer to FIG. 5).

According to the embodiment, in the state where the both members 6 and 8 separate from each other, the center surface PL6 of the tapered surfaces on both sides of the telescopic gear base 6, and the center surface PL8 of the tapered surfaces on both sides of the telescopic gear member 8 shift from each other. By rotating the operational lever 5, the telescopic gear base 6 and the telescopic gear member 8 are driven by the cam drive so that the center surfaces PL6 and PL8 come close to each other from start of intermeshing between the telescopic gear base 6 and the telescopic gear member 8 to completion of intermeshing. This constitution can realizes smooth intermeshing between the telescopic gear base 6 and the telescopic gear member 8. Though the telescopic gear base 6 and the telescopic gear member 8 have been described above, this constitution can be similarly applied to a tilt gear base 7 and a tilt gear member 9.

Figure 18:
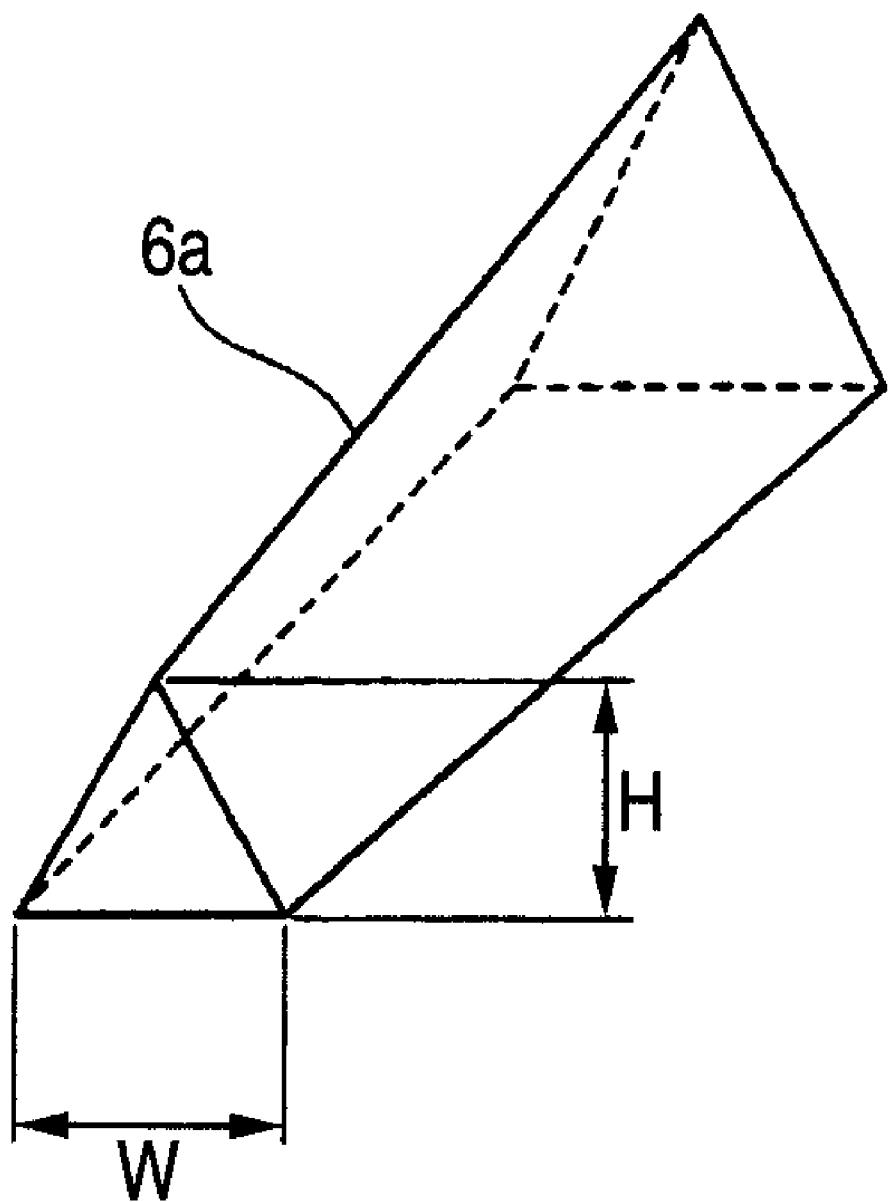
FIG. 18 is a perspective view of a tooth 6a of the telescopic gear base 6.

FIG. 18 is a perspective view of the tooth 6a of the telescopic gear base 6. The tooth 6a having a triangular section which is orthogonal in the longitudinal direction (though it is preferable that the shape of this section is an isosceles triangle, the shape is not limited to its shape) has the tapering shape. More specifically, the sectional area of the tooth becomes small at the tip portion of the tooth trace (namely, at least one of the height H of tooth and the width W of tooth is smaller), and the portion where the sectional area of the tooth does not become small to the portion where the sectional area of the tooth becomes small, and to a sharp point portion where a tip sharpens are formed smoothly. Since the tooth 6a has such the tapering shape, it can smoothly intermesh with the tooth 8a of the telescopic gear member 8. The tooth 8a of the telescopic gear member 8 may have the tapering shape similarly. Further, such the constitution can be similarly applied to the tilt gear base 7 and the tilt gear member 9.

Second Embodiment

Next, a second embodiment of the invention will be described with reference to FIGS. 19 and 20. A tilt/telescopic steering column apparatus according to the second embodiment is characterized in that a tooth trace is inclined so that a contact ratio η increases by force applied in the crash time. Members in the second embodiment similar to those in the above first embodiment are denoted by the same reference signs, and their detailed description is omitted.

FIG. 19 is a diagram showing a telescopic gear base 6 and a telescopic gear member 8 in the ordinary time. FIG. 20 is a diagram showing the telescopic gear base 6 and the telescopic gear member 8 in the crash time.

Figure 19A:
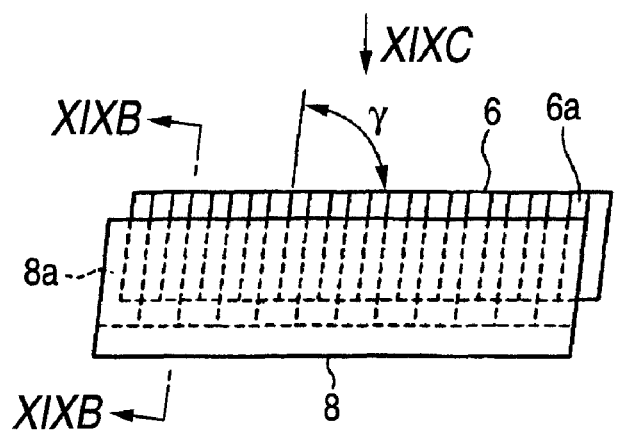
FIG. 19A is a diagram showing a telescopic gear base 6 and a telescopic gear member 8 in the ordinary time according to a second embodiment.
Figure 19B:
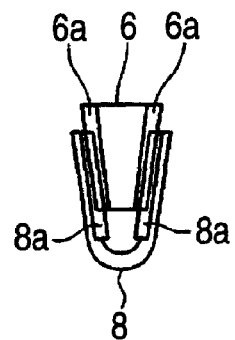
FIG. 19B is a diagram viewed in the direction of an arrow XIX B in FIG. 19A.
Figure 19C:
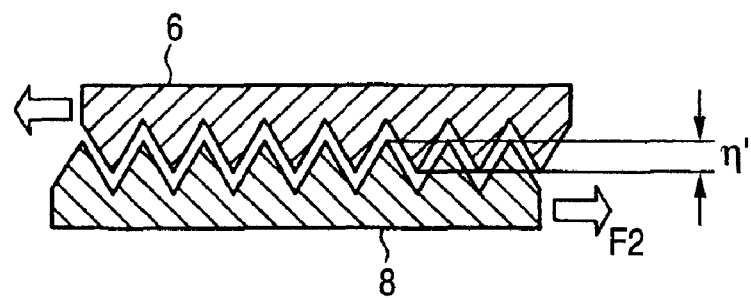
FIG. 19C is a diagram viewed in the direction of an arrow XIX C in FIG. 19A.
Figure 20A:
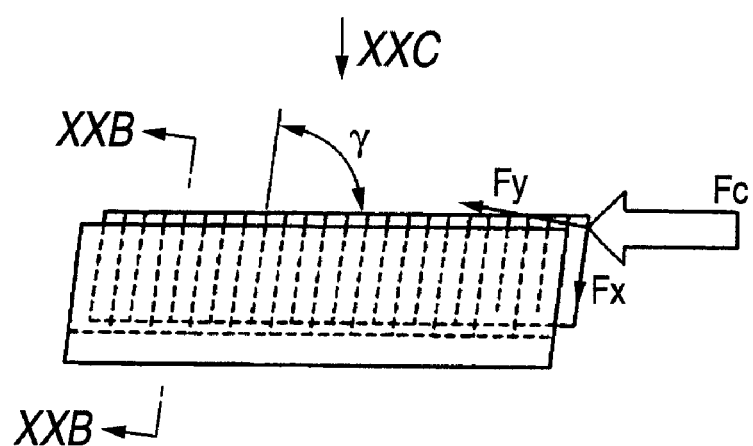
FIG. 20A is a diagram showing the telescopic gear base 6 and the telescopic gear member 8 in the crash time according to the second embodiment.
Figure 20B:
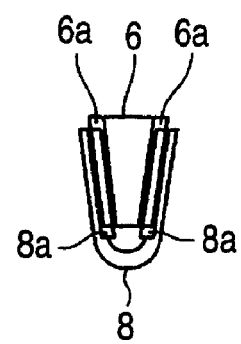
FIG. 20B is a diagram viewed in the direction of an arrow XX B in FIG. 20A.
Figure 20C:
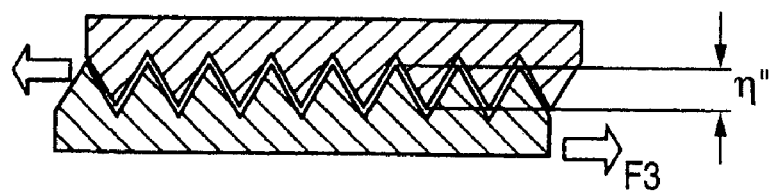
FIG. 20C is a diagram viewed in the direction of an arrow XX C in FIG. 20A.

FIG. 19A and FIG. 20A are diagrams, viewed from the vehicle body side, respectively, FIG. 19B is a diagram viewed in the direction of an arrow XIX B in FIG. 19A, FIG. 20B is a diagram viewed in the direction of an arrow XX B in FIG. 20A, FIG. 19C is a diagram viewed in the direction of an arrow XIX C in FIG. 19A, and FIG. 20C is a diagram viewed in the direction of an arrow XX C in FIG. 20A.

In the embodiment, an angle of each tooth trace of teeth 6a, 8a with an axial line of a steering shaft 4 (FIG. 1) is set to $\gamma = 85°$, and the tooth trace is inclined not in the vertical direction to the axial line but to the steering wheel (not shown) side. Here, a contact ratio between the teeth 6a and 8a in the ordinary time is taken as η' (refer to FIG. 19(c)), and the holding force at this time is taken as F2.

For example, a case where a secondary crash of a vehicle has occurred and a driver has struck the steering wheel will be thought. In this case, the telescopic gear base 6 and the telescopic gear member 8 receive such force FC that they move relatively in the axial direction of the steering shaft 1 (refer to FIG. 20(a)). However, according to this embodiment, since each tooth trace of teeth 6a, 8a is inclined at the angle of $\gamma = 85°$, the force Fc is divided into a component Fx in the direction along the tooth traces of the teeth 6a, 8a and a component Fy in a perpendicular direction to the above direction.

Since the force component Fx is force by which the telescopic gear base 6 is pressed toward the telescopic gear member 8, the telescopic gear base 6 is pushed into the telescopic gear member 8 as shown in FIGS. 20A and 20B. Further, since the teeth 6a, 8a are formed on tapered surfaces of the telescopic gear base 6 and the telescopic gear member 8, the teeth 6a and 8a are pressed toward each other. A contact ratio η″ at this time becomes larger than a contact ratio η' at the ordinary time. Therefore, holding force F3 at the crash time is higher than holding force F2 at the ordinary time. Since the force component Fx increases in proportion to the magnitude of the force Fc, the holding force can be heightened according to the strength of the impact power. Namely, according to the embodiment, even in case that the number of teeth is set small, the holding force can be secured. Therefore, regardless of a lightweight and compact steering column apparatus, good operational feeling can be secured. The angle γ may be set to be 90° or less. Namely, as long as the tooth trace has an angle with a direction of the collision force, any angle may be used. Also regarding a tilt gear base 7 and a tilt gear member 9, a tooth trace can similarly have a certain angle.

Further, though the tooth traces of the telescopic gear base 6 and the telescopic gear member 8 are straight lines, it is preferable that they are formed in the shape of a circular arc having a radius of curvature R (FIG. 1) around an operation lever 5. Since the telescopic gear member 8 is fixed to the operational lever 5, the moving axis trace of the tooth 8a of the telescopic gear member 8 becomes circular arc-shaped. When a very small amount of elements of each tooth trace of the telescopic gear base 6 and the telescopic gear member 8, which is formed in the shape of a circular arc, are taken out, as long as the inclination of the tooth trace is within a range of 0° to 90°, the contact ratio between the gears increase due to input of the force at the crash time. Further, since the tooth traces are formed in the shape of a circular arc, when the teeth 6a and the teeth 8a intermesh with each other, the operational feeling improves.

Third Embodiment

When an excessive force acts on a column at the crash time of a vehicle, similarly to the case in the above second embodiment, there is fear that gears loosen. When looseness of the gears is produced, a contact ratio of gears lowers, so that there is a possibility that the gears are damaged or intermeshing between the gears itself is released. In order to suppress the above looseness of the gears, it is thought that a member having high rigidity is used in a steering column apparatus or a special mechanism for suppressing the looseness of the gears is used. However, this is not desirable because cost increases and the structure become complicated.

Therefore, in case that the shape and the size of the gear are set as described below in order to solve the above problem, the problem that the gears are loosened is solved by friction force acting on a tooth surface of the gear. Further, according to the third embodiment of the invention, a steering column apparatus which has simple structure and low cost can be provided.

For comparison with the third embodiment of the invention described later, as the gear structure of a conventional steering gear apparatus, the gear structure disclosed in JP-A-9-221043 will be shown in FIGS. 21 and 22.

Figure 21:
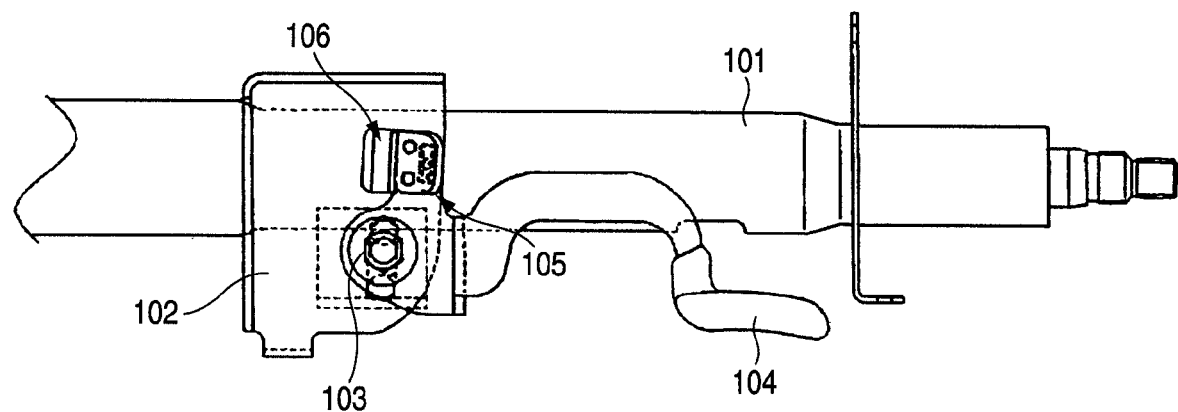
FIG. 21 is a diagram for explaining a third embodiment, showing a conventional steering apparatus.
Figure 22:
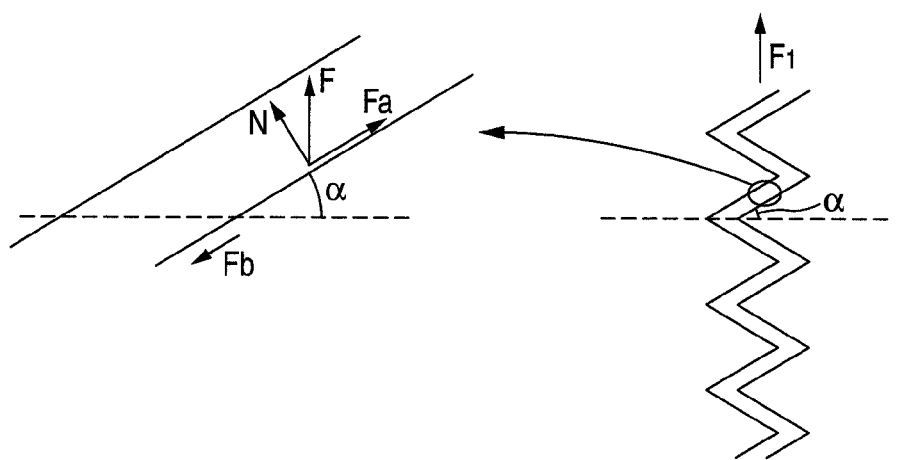
FIG. 22 is a diagram for explaining the third embodiment, showing a conventional gear mechanism.

According to the conventional gear structure shown in FIG. 21, at the crash time of a vehicle, a column 101, a lever shaft 103, a lever 104, and a gear 105 attached to the lever 104 receive a collision force which moves them in the direction of an arrow. Against this collision force, the movement of their members 101, 103, 104 and 105 is suppressed by intermeshing between a gear 106 attached to a bracket 102. However, in case that an excessive collision force $F_1$ acts as shown in FIG. 22, a component of force Fa produced by decomposition of the collision force by the frictional surface becomes larger than a frictional force Fb produced on the gear surface. As a result, since the lever 104 separates from the gear 106 together with the gear 105, the clamped state of the lever is released. Namely, the intermeshing between the gears itself is released, and the clamped state cannot be kept.

In order to prevent release of the above clamp mechanism, the frictional force Fb should be set to become larger than the component of force Fa of the collision force. For example, referring to FIG. 22, it is thought that a vertical angle α of the gear is set to be smaller than a frictional angle μ between the tooth surfaces. Here, the component of force Fa is, using the vertical angle α, represented by $Fa = F_1 \sin \alpha$, while the frictional force Fb is, using the vertical angle α and the frictional angle μ, represented by $F_1 \cos \alpha \cdot \tan \mu$.

When the frictional force Fb is set to be larger than the component of force Fa (Fb>Fa), the following expression is obtained.

$$F_1 \cos \alpha \cdot \tan \mu > F_1 \sin \alpha$$

$$\tan \mu > \tan \alpha$$

Therefore, a relational expression of μ>α is drawn.

Though a half-vertical angle of the gear is generally set at 25° or 30°, in case that a vertical angle of tooth is set to be smaller than this angle, the dedendum thickness becomes smaller and strength of tooth cannot be sufficiently secured. Further, workability of tooth becomes very difficult. Therefore, it is a realistic solving method to set the vertical angle of the above gear is set to be smaller than the frictional angle.

Therefore, in order to prevent the release of the above clamp mechanism, as described below, it has been devised as the third embodiment of the invention that the whole of the tooth surface is inclined at an angle of β with the intermeshing direction of teeth, and the tooth continuing direction is inclined at an angle of γ with the direction where the collision force acts.

The third embodiment of the invention will be described below in detail with reference to FIGS. 23A to 24. Under the constitution in the third embodiment of the invention, the whole of the tooth surface is inclined at the angle of β, and an angle made by the tooth continuing direction and the collision force direction is set at the angle of γ. Other members in the third embodiment similar to those in the first and second embodiments are denoted by the same signs, and their description is omitted.

As shown in FIGS. 23A to 23E, in the following description, a half-vertical angle of each tooth is defined as α, an inclined angle of the tooth surface with the teeth-intermeshing direction is defined as β, and an angle made by the tooth continuing direction and the collision force direction is defined as γ.

First, with reference to FIGS. 23A to 23E which shows an embodiment in which the inclined angle γ of the tooth trace is 90°, the third embodiment will be described. FIG. 23A is a diagram showing a gear member and a gear base, viewed from the axial direction of a vehicle body. FIG. 23B is a diagram viewed from a side surface of FIG. 23A. FIG. 23C is a main portion enlarged view of FIG. 23A, and FIG. 23D is a main portion enlarged view of FIG. 23B. Further, FIG. 23E is a diagram viewed in the direction of an arrow XXIII E of FIG. 23C.

As shown in FIG. 23A, according to the third embodiment, the whole of the tooth surfaces of the gear base and the gear member is inclined at the angle of β with the intermeshing surface. Here, the intermeshing surface means a surface along a locus formed by a long axis of the gear member when the gear member is moved so that the contact ratio increases after the gear base and the gear member have intermeshed with each other.

As shown in FIGS. 23A and 23B, a surface which is parallel to the intermeshing surface and goes across a part of the tooth trace is defined as a surface P. The intermeshing of tooth traces, as described below in detail, is kept by the frictional force generated on a segment of a line appearing on this surface P.

In a triangle formed when this surface P goes across the teeth, a point corresponding to a vertex of the tooth is defined as a1, and two points corresponding to a bottom of the tooth trace are defined respectively as b1 and b2. Further, a point where a surface which is orthogonal to the surface P through the line b1-b2 intersects the vertex of the tooth trace is defined as a2. Further, a point of intersection between the surface P passing through the point a2 and the surface P on a normal line is defined as b.

Here, the half-vertical angle α is a half angle of an angle formed by points b1, c, and b2 as shown in FIG. 23E, and the inclined angle β of the tooth surface is represented by an angle formed by the points b, a1, and a2 as shown in FIG. 23C.

Further, an angle θ is defined by an angle formed by the line a1-b1 and the collision direction. Namely, the angle θ can set as an angle formed by the direction where the frictional force acts and the collision force direction. This angle θ is a parameter which defines difficulty in release of gears.

A point where a normal line of the line a1-a2 which passes through the point b intersects the line a1-a2 is defined as a point c. Further, for the purpose of the following description, a side defined by the points a1 and b is represented by a side A, and a side defined by the points b1 and b is represented by a side B, and a side defined by the points b and c is represented by a side C.

As shown in FIG. 23D, the angle α is represented by tan α=B/C, and the angle β is represented by sin β=C/A. Accordingly, B=C·tan α, and A=C/sin β are obtained. Further, since the angle θ is represented by tan θ=A/B, representing θ by means of α and β, the following expression is obtained.

$$\tan \theta = (C/\sin \beta)/(C \cdot \tan \alpha) = 1/\tan \alpha \cdot \sin \beta$$

Therefore, 1/tan θ=tan α·sin β, and by transforming this expression, tan θ(90°−θ)=tan α·sin β. From this expression, regarding θ, the following relational expression is obtained.

$$90° - \theta = \tan^{-1}(\tan \alpha \cdot \sin \beta)$$

When the frictional angle between both tooth surfaces in the teeth intermeshing direction is taken as μ, in case that 90°−θ which represents the inclined angle of tooth is smaller than the frictional force between tooth surfaces, even if the collision force acts, intermeshing of teeth never loosen due to the friction force between the tooth surfaces, and it is possible to prevent the contact ratio from lowering, so that it is possible to prevent release from the intermeshing state between the teeth and the lever. Namely, the above condition is represented by the following expression.

$$\mu > 90° - \theta$$

In case that θ is represented by α and β based on the above relational expression, the following expression is obtained.

$$\mu > 90° - \theta = \tan^{-1}(\tan \alpha \cdot \sin \beta)$$

Next, a case where an angle formed by the tooth trace and the collision force direction is γ will be described with reference to FIG. 24. FIG. 24 corresponds to FIG. 23D. The tooth trace in FIG. 24 is inclined from the tooth trace in FIG. 23D at (90°−γ) in the teeth intermeshing direction at the crash time. Therefore, an angle which the line a1-b1 which is a direction where the frictional force acts forms together with the collision direction becomes θ+(90°−γ). At this time, similarly to the above, from $$90° - \{\theta + (90° - \gamma)\} = \tan^{-1}(\tan \alpha \cdot \sin \beta) - (90° - \gamma) \text{ and}$$
$$\mu > 90° - \{\theta + (90° - \gamma)\},$$

the following conditional expression is drawn.

$$\mu > \tan^{-1}(\tan \alpha \cdot \sin \beta) - (90° - \gamma) \text{(conditional expression)}$$

When α, β, γ and μ are set so that the above conditional expression is satisfied, the intermeshing between the teeth never loosen, and it is possible to prevent the teeth and the lever from disengaging from the intermeshing state.

Figure 24:
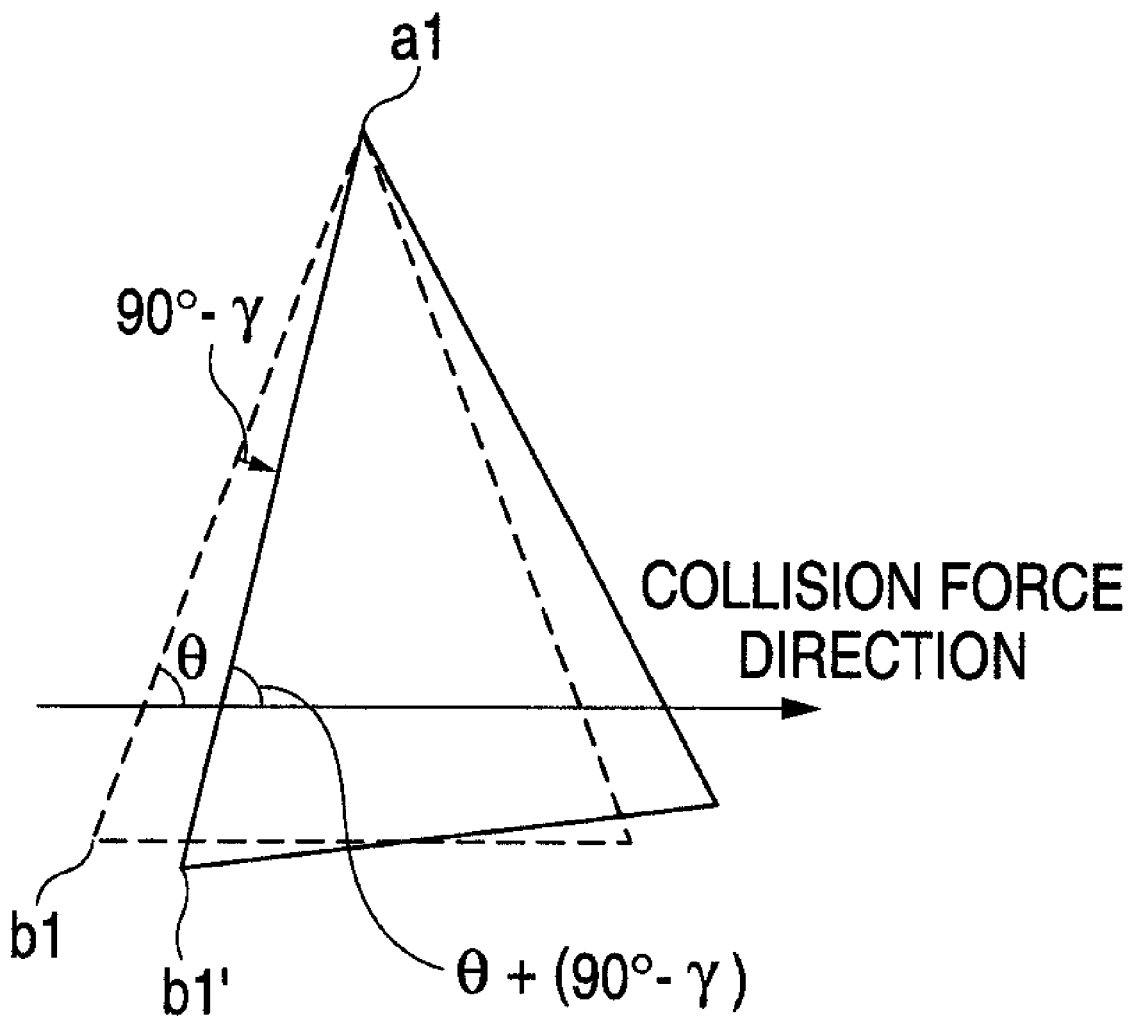
FIG. 24 is a diagram showing the gear member in case that an inclined angle of the tooth trace is γ° in FIG. 23C.
Figure 25:
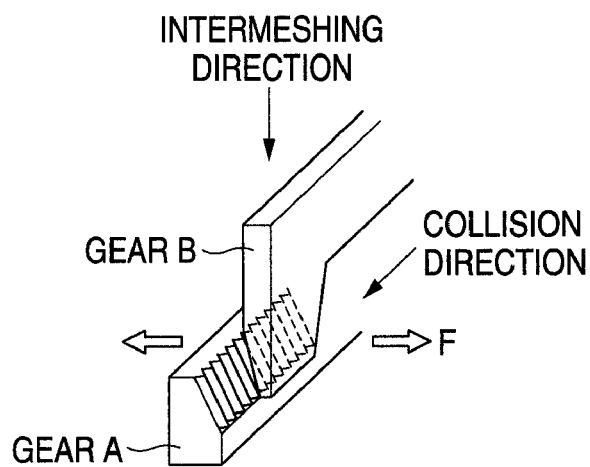
FIG. 25 is a comparison diagram for explaining a fourth embodiment, showing a case where intermeshing of gears is constituted by a set of tooth surfaces.

Though it has been described that the collision force acts from the upside to the downside in FIGS. 24 and 25, also in case that the collision force acts from the downside to the upside (namely, in case that the collision force acts in the direction where the gears disengage from each other), the above-mentioned conditional expression can be applied.

Example to which Third Embodiment is Applied

A concrete example of the above third embodiment of the invention will be described below. Table 1 shows α, β, and γ in an example in which intermeshing of teeth is retained and in an example in which intermeshing of teeth is not retained.

TABLE 1

|  | Retaining example | Not retaining example |
|---|---|---|
| α [°] | 25 | 25 |
| β [°] | 2 | 45 |
| γ [°] | 88 | 90 |
| tan⁻¹ (tan α · sin β) −(90°−γ) [°] | −1.07 | 18.25 |
| Frictional angle [°] | 4.57 | |

When α, β, and γ are set to the numeral values in the example in which intermeshing of teeth is retained so as to satisfy the above conditional expression, even in case that the collision force acts, intermeshing of teeth is retained, and the lever is kept in the clamped state. When $\tan^{-1}$ (tan α·sin β)−(90°−γ) becomes a minus value, the teeth are inclined in a direction where they mesh together in crash. Further, a case where $\tan^{-1}$ (tan α·sin β)−(90°−γ) is a minus value and its absolute value is larger than the frictional angle represents that the teeth slide in the direction where they mesh together in crash. Further, even in case that the inclined angle γ is inclined in the direction where the teeth disengage from each other by the collision force, as long as the conditional expression is satisfied, intermeshing of teeth is held by the friction between the tooth surfaces, so that it is possible to prevent the contact ration of the teeth from lowering.

According to the third embodiment, the constitution in which the gears are difficult to disengage from each other is provided by inclining the tooth continuing direction at the angle γ to increase the contact ratio η in the vehicle crash time, as described in the second embodiment. Further, the inclined angle β of the whole of the tooth surface is specified, whereby a steering column apparatus having the constitution in which the gears are difficult to disengage from each other is provided.

Thus, by setting the tooth surface angles α, β, γ and θ by a three-dimensionally predetermined relational expression so that θ does not exceed the frictional angle, it is possible to prevent the intermeshing length in the tooth continuing direction from decreasing and the contact ratio from lowering. In result, an advantage that the intermeshing teeth never disengage from each other also when the excessive load is applied is obtained.

Fourth Embodiment

Figure 26:
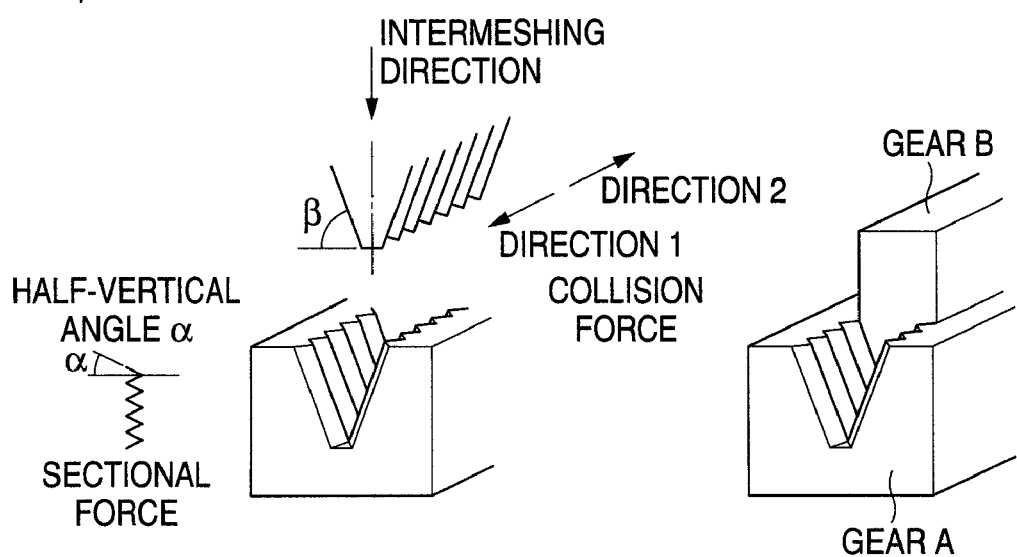
FIG. 26 is a perspective view showing a gear member in the fourth embodiment.

With reference to FIGS. 25 and 26, a fourth of the invention will be described.

As shown in FIG. 25, in case that intermeshing of gears is constituted by a set of tooth surfaces in a gear A and a gear B, the gear A and the gear B are easy to move relatively in the collision force direction or in the normal line direction of the intermeshing direction. Namely, a contact ratio of the gears lowers and lastly the intermeshing of the gears disengages. In order to prevent this disengagement, it is necessary to heighten rigidity of each member in a steering column apparatus so as to prevent the gear A and the gear B from moving relatively. However, it is nearly impossible to meet such the demand.

Therefore, when two sets of gears are opposed at a predetermined angle and arranged so as to form the wedge shape as shown in FIG. 26 which shows the fourth embodiment of the invention, force acting in the collision direction and force acting in a normal line direction of the intermeshing direction can be offset on both surfaces of a gear A and a gear B. Therefore, it is possible to prevent the relative movement between the gear A and the gear B along the collision direction and the normal line direction of the intermeshing direction of the gear A and the gear B.

As described in the third and fourth embodiments, by setting the tooth surface angles α, β, γ and θ by a three-dimensionally predetermined relational expression so that θ does not exceed the frictional angle, it is possible to prevent the intermeshing length in the tooth continuing direction from decreasing and the contact ratio from lowering. In result, an advantage that the intermeshing teeth never disengage from each other also when the excessive load is applied is obtained.

Although the invention has been described above in detail with reference to the embodiments, it is to be distinctly understood that the invention is not limited to the above embodiments but that changes and improvements may be appropriately made without departing from the spirit of the invention. For example, the gear base and the gear member may have reverse constitution and shape respectively, and combination of their members is arbitrary. Further, with combination of the first embodiment to the fourth embodiment, the steering column apparatus may be constituted.

Although the invention has been described in detail and with reference to its specified embodiments, it will be obvious to those skilled in the art that various changes and modifications may be made without departing from the spirit or scope of the invention.

This application is based on prior Japanese Patent Applications No. 2005-134974 filed on May 6, 2005, No. 2005-143434 filed on May 17, 2005, and No. 2006-72616 filed on Mar. 16, 2006. The entire contents of these Japanese Patent Applications are hereby incorporated by reference.

INDUSTRIAL APPLICABILITY

According to the steering column apparatus of the invention, the first tooth and the second tooth are brought close to each other in other direction than the normal line direction and the tangent line direction (including a direction parallel to a tangent line) in relation to their respective tooth traces, and intermeshed. Therefore, the poor intermeshing between the first tooth and the second tooth can be suppressed. Accordingly, it is avoided that the operational feeling becomes bad as the case where the many frictional plates are used. Further, after the first tooth and the second tooth have intermeshed, the large holding force can be exhibited. Particularly, in case that the contact ratio is increased while the first tooth and the second tooth are being slid in their tooth continuing directions after first intermeshing between the first tooth and the second tooth has started, smooth intermeshing can be performed.

The invention claimed is:

1. A steering column apparatus which supports a steering shaft so that a position of the steering shaft is adjustable in at least one of a tilt direction and a telescopic direction, comprising:
   a first tooth fixed to a vehicle body side;
   a column body which supports the steering shaft rotatably; and
   a second tooth which moves integrally with the column body, wherein the first tooth and the second tooth intermesh with each other, thereby to position the column body to the vehicle body,
   the first tooth and the second tooth separate from each other, thereby to put the column body in a position-adjustable state with respect to the vehicle body;
   an approach direction of the second tooth relative to the first tooth, from a time just before the first tooth intermeshes with the second tooth to a completion time of intermeshing between their teeth, is set so that each angle with an angle of inclination of the first tooth and an angle of inclination of the second tooth is larger than 0° and smaller than 90°, whereby the first tooth and the second tooth are brought towards each other and lastly intermesh; and
   a center of the first tooth and a center of the second tooth are out of alignment with respect to a direction perpendicular to a moving direction of the second tooth before the first tooth intermeshes with the second tooth, and the center of the first tooth and the center of the second tooth are aligned with respect to the direction perpendicular to the moving direction of the second tooth after the first tooth intermeshes with the second tooth.

2. The steering column apparatus according to claim 1, wherein
   one of the first tooth and the second tooth is provided on a pair of first inclined surfaces opposed to each other, and
   the other of the first tooth and the second tooth is provided on a pair of second inclined surfaces respectively opposed to a pair of the first inclined surfaces.

3. The steering column apparatus according to claim 2, wherein
   the first tooth and the second tooth, under a separate state from each other, are arranged in a state where a center surface of the first inclined surfaces defined between the pair of the first inclined surfaces and a center surface of the second inclined surfaces defined between the pair of the second inclined surfaces shift from each other, and
   there is provided a drive unit which drives the first tooth and the second tooth so as to bring the center surface of the first inclined surfaces and the center surface of the second inclined surfaces towards each other before the first tooth and the second tooth are intermeshed with each other.

4. The steering column apparatus according to claim 2, wherein
   the pair of the first inclined surfaces are opposite to each other at a predetermined angle and form a wedge-shape, and
   the pair of the second inclined surfaces are also opposite to each other at a predetermined angle and has a wedge-shape.

5. The steering column apparatus according to claim 1, wherein
   by rotating and moving a lever coupled to one of the first tooth and the second tooth, one of the first tooth and the second tooth which moves together with the lever so as to have a locus having a shape of a circular arc engages with the other of the first tooth and the second tooth.

6. The steering column apparatus according to claim 1, wherein
   at least one of the first tooth and the second tooth is formed so that a sectional area of the tooth becomes smaller toward its tip.

7. The steering column apparatus according to claim 1 further comprising:
   a bracket fixed to the vehicle body; and
   a lever which is swingably attached to the bracket, wherein
   the first tooth is provided on the bracket fixed to the vehicle body side, and
   the second tooth is provided on the lever.

8. The steering column apparatus according to claim 1, comprising:
   a lever supported swingably by a bracket fixed to the vehicle body, wherein
   telescopic movement of the column body with respect to the lever is permitted with rotation of the lever,
   the first tooth is provided on the lever supported on the vehicle body side, and
   the second tooth is provided on the column body which moves telescopically.

9. The steering column apparatus according to claim 1, wherein
   each tooth traces of the first tooth and the second tooth is inclined in a direction where a contact ratio increases when force is applied to the steering shaft.

10. The steering column apparatus according to claim 9, wherein
    tooth surfaces are arranged so as to satisfy following conditional expression when
    a frictional angle between the first tooth and the second tooth is defined as $\mu$,
    each half-vertical angle of the first tooth and the second tooth is defined as $\alpha$,
    each angle of the tooth surface of the first tooth and the tooth surface of the second tooth with an intermeshing surface is defined as $\beta$, and
    each of the angle of inclination of the first tooth and the angle of inclination of the second tooth with a direction of the above force is defined as $\gamma$:

$\mu > \tan^{-1}(\tan \alpha \cdot \sin \beta) - (90° - \gamma)$ (conditional expression).

11. A steering column apparatus which supports a steering shaft so that the position of the steering shaft is adjustable in at least one of a tilt direction and a telescopic direction, comprising:
    a first tooth fixed to a vehicle body side;
    a column body which supports the steering shaft rotatably; and
    a second tooth which moves integrally with the column body, wherein
    the first tooth and the second tooth intermesh with each other, thereby to position the column body to the vehicle body,
    the first tooth and the second tooth separate from each other, thereby to put the column body in a position-adjustable state with respect to the vehicle body, and
    in the first tooth and the second tooth, each tooth trace is inclined toward a side of the column body based on a perpendicular line to an axis line of the steering shaft.

12. The steering column apparatus according to claim 11, wherein
    one of the first tooth and the second tooth is provided on a pair of first inclined surfaces opposed to each other, and the other of the first tooth and the second tooth is provided on a pair of second inclined surfaces respectively opposed to the pair of the first inclined surfaces.

13. The steering column apparatus according to claim 11, wherein
the pair of the first inclined surfaces is opposite to each other at a predetermined angle and form a wedge-shape, and
a pair of the second inclined surfaces is also opposite to each other at a predetermined angle and has a wedge-shape.

14. The steering column apparatus according to claim 11, wherein
tooth surfaces are arranged so as to satisfy following conditional expression when
a frictional angle between the first tooth and the second tooth is defined as $\mu$,
each half-vertical angle of the first tooth and the second tooth is defined as $\alpha$,
each angle of a tooth surface of the first tooth and a tooth surface of the second tooth with an intermeshing surface is defined as $\beta$, and
each of the angle of inclination of the first tooth and the angle of inclination of the second tooth with a direction of the above force is defined as $\gamma$:

$\mu > \tan^{-1}(\tan \alpha \cdot \sin \beta) - (90° - \gamma)$ (conditional expression).

\* \* \* \* \*